United States Patent
Izumi et al.

(10) Patent No.: US 8,129,944 B2
(45) Date of Patent: Mar. 6, 2012

(54) CONTROL DEVICE FOR A SECONDARY BATTERY AND VEHICLE

(75) Inventors: Junta Izumi, Toyota (JP); Teruo Ishishita, Nishikamo-gun (JP); Junichi Matsumoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 409 days.

(21) Appl. No.: 12/449,326

(22) PCT Filed: Mar. 5, 2008

(86) PCT No.: PCT/JP2008/054437
§ 371 (c)(1),
(2), (4) Date: Aug. 3, 2009

(87) PCT Pub. No.: WO2008/111594
PCT Pub. Date: Sep. 18, 2008

(65) Prior Publication Data
US 2009/0315519 A1 Dec. 24, 2009

(30) Foreign Application Priority Data
Mar. 7, 2007 (JP) .................................. 2007-056944

(51) Int. Cl.
*H01M 10/46* (2006.01)
(52) U.S. Cl. ........................................................ 320/116
(58) Field of Classification Search .................. 320/104, 320/107, 112, 116, 117, 120, 122, 134, 136; 324/426, 427, 430, 433
See application file for complete search history.

(56) References Cited

U.S. PATENT DOCUMENTS

| | | | |
|---|---|---|---|
| 6,563,291 B2 | 5/2003 | Tamura et al. | |
| 2006/0087291 A1 | 4/2006 | Yamauchi | |
| 2006/0132139 A1* | 6/2006 | Ohta et al. | 324/426 |
| 2007/0001650 A1 | 1/2007 | Soma et al. | |

FOREIGN PATENT DOCUMENTS

| | | |
|---|---|---|
| JP | A-2000-137062 | 5/2000 |
| JP | A-2002-101565 | 4/2002 |
| JP | A-2003-32907 | 1/2003 |
| JP | A-2003-79059 | 3/2003 |
| JP | A-2003-303626 | 10/2003 |
| JP | A-2004-166368 | 6/2004 |
| JP | A-2005-108543 | 4/2005 |
| JP | A-2006-129588 | 5/2006 |
| JP | A-2007-14072 | 1/2007 |

* cited by examiner

*Primary Examiner* — Edward Tso
(74) *Attorney, Agent, or Firm* — Oliff & Berridge, PLC

(57) ABSTRACT

A control device for a secondary battery includes an offset addition unit calculating an offset amount based on a plurality of voltage values sensed by a sensor, the number of a plurality of battery cells included in one battery block and a preset range, and adding an offset amount to the sensed voltage values, when a flag is turned on to indicate the fact the voltage value of one of the battery cells falls within a preset range, and also includes an I/O control unit controlling charge/discharge of the battery based on voltage values containing the offset amount added thereto. Even when the battery voltage is sensed a battery block at a time, the voltage value can be controlled a cell at a time.

24 Claims, 14 Drawing Sheets

_US 8,129,944 B2_

CONTROL DEVICE FOR A SECONDARY BATTERY AND VEHICLE

TECHNICAL FIELD

The invention relates to a control device for a secondary battery as well as a vehicle equipped with it, and particularly to a control device that can protect a secondary battery as well as a vehicle equipped with the same.

BACKGROUND ART

In recent years, attention has been given to hybrid vehicles and electric vehicles against the background of environmental issues. These vehicles are equipped with an electric motor as a drive power source, and are also equipped with, e.g., a secondary battery as its electric power source. In general, the secondary battery mounted on the vehicle includes a plurality of battery blocks connected in series together. Each battery block includes a plurality of battery cells connected in series together.

For example, Japanese Patent Laying-Open No. 2002-101565 has disclosed a voltage adjusting device and method that can adjust variations in terminal voltage between the plurality of unit cells forming a battery assembly. This voltage adjusting device includes upper limit voltage sensing means for sensing that the terminal voltage of each unit cell exceeds an upper limit voltage, discharging means configured to discharge the unit cell of which terminal voltage sensed by the upper limit voltage sensing means exceeds the upper limit voltage, voltage sensing means for sensing a voltage of a cell group formed of some of the units cells forming the battery assembly and charge/discharge control means controlling the charge/discharge performed between the battery assembly and a load. When the upper limit voltage sensing means senses the unit cell having the terminal voltage exceeding the upper limit voltage, the charge/discharge control means controls driving of the load such that the discharge from the battery assembly is performed preferentially. Further, based on a result of the sensing by the upper limit voltage sensing means and an average unit cell voltage of the cell group obtained by the voltage sensing means, the charge/discharge control means may determine that the variations in terminal voltage between the unit cells forming the cell group in question have increased to a predetermined level or higher, in which case the charge/discharge control means performs the charging such that the average unit cell voltage of this cell group exceeds the upper limit voltage by a predetermined voltage.

When the above control method is used, however, the cell group is charged such that the average unit cell voltage exceeds the upper limit voltage by the predetermined voltage so that characteristics of the cell group may deteriorate. Japanese Patent Laying-Open No. 2002-101565 has not disclosed a possibility of occurrence of this problem.

DISCLOSURE OF THE INVENTION

An object of the invention is to provide a control device of a secondary battery that can suppress deterioration due to overcharge or overdischarge as well as a vehicle equipped with the same.

In summary, the invention provides a control device for a secondary battery having a plurality of battery cells forming a plurality of battery blocks. The control device includes an abnormality sensing unit, a voltage sensing unit, an offset addition unit and a charge/discharge control unit. The abnormality sensing unit senses the fact that a cell voltage value of one of the plurality of battery cells falls outside a preset range, and outputs an abnormality notification indicating a result of the sensing. The voltage sensing unit senses a plurality of block voltages corresponding to the plurality of battery blocks, respectively, and outputs a plurality of first voltage values representing the plurality of block voltages, respectively. The offset addition unit calculates, in response to reception of the abnormality notification, an offset amount common to the plurality of first voltage values based on the plurality of first voltage values, the preset range and the number of the battery cells included in each of the plurality of battery blocks. The offset addition unit produces a plurality of second voltage values by adding the offset amount to each of the plurality of first voltage values. The charge/discharge control unit limits the charge power of the secondary battery and the discharge power of the secondary battery based on the plurality of second voltage values produced by the offset addition unit.

Preferably, the offset addition unit sets the offset amount to zero when the offset addition unit senses ending of the output of the abnormality notification by the abnormality sensing unit.

Further preferably, the offset addition unit starts to decrease gradually the offset amount when the abnormality sensing unit ends the output of the abnormality notification.

Preferably, the offset addition unit adds a predetermined amount as the offset amount to each of the plurality of first voltage values, when the offset amount being calculated exceeds the predetermined amount.

Preferably, when the secondary battery is charged, the offset addition unit calculates, based on the maximum voltage value among the plurality of first voltage values and the number of the battery cells included in the battery block corresponding to the maximum voltage value among the plurality of battery blocks, an average value of the voltages of the battery cells included in the corresponding battery block and calculates the offset amount based on a difference between an upper limit value of the preset range and the average value as well as the number of the battery cells included in the corresponding battery block.

Preferably, when the secondary battery is discharged, the offset addition unit calculates, based on the minimum voltage value among the plurality of first voltage values and the number of the battery cells included in the battery block corresponding to the minimum voltage value among the plurality of battery blocks, an average value of the voltages of the battery cells included in the corresponding battery block and calculates the offset amount based on a difference between a lower limit value of the preset range and the average value as well as the number of the battery cells included in the corresponding battery block.

Preferably, the abnormality sensing unit stores, as the preset range, a first range and a second range including the first range, outputs a first notification as the abnormality notification when the abnormality sensing unit senses that the cell voltage value falls outside the first range, and outputs the first notification and a second notification as the abnormality notification when the abnormality sensing unit senses that the cell voltage value falls outside the second range.

Further preferably, the first range has a first upper limit value. The second range has a second upper limit value. During the charging of the secondary battery, the charge/discharge control unit decreases the charge power such that a decrease rate representing an amount of decrease of the charge power per unit time takes a first value when the cell voltage value is larger than the first upper limit value and smaller than the second upper limit value, and decreases the charge power such that the decrease rate takes a second value larger than the first value when the cell voltage value is larger than the second upper limit value.

Further preferably, the control device further includes a diagnosing unit. The diagnosing unit diagnoses the secondary battery as being in the overcharged state when the charge power is zero and the abnormality sensing unit outputs the first and second notifications.

More preferably, the first range has a first lower limit value. The second range has a second lower limit value. During the discharging of the secondary battery, the charge/discharge control unit decreases the discharge power such that a decrease rate representing an amount of decrease of the discharge power per unit time takes a first value when the cell voltage value is smaller than the first lower limit value and larger than the second lower limit value, and decreases the discharge power such that the decrease rate takes a second value larger than the first value when the cell voltage value is smaller than the second lower limit value.

Further preferably, the control device further includes a diagnosing unit. The diagnosing unit diagnoses the secondary battery as being in the overdischarged state when the discharge power is zero and the abnormality sensing unit outputs the first and second notifications.

Preferably, the plurality of battery cells include a lithium-ion battery.

According to another aspect of the invention, a vehicle includes a secondary battery having a plurality of battery cells forming a plurality of battery blocks, and a control device controlling charge/discharge of the secondary battery. The control device includes an abnormality sensing unit, a voltage sensing unit, an offset addition unit and a charge/discharge control unit. The abnormality sensing unit senses the fact that a cell voltage value of one of the plurality of battery cells falls outside a preset range, and outputs an abnormality notification indicating a result of the sensing. The voltage sensing unit senses a plurality of block voltages corresponding to the plurality of battery blocks, respectively, and outputs a plurality of first voltage values representing the plurality of block voltages, respectively. The offset addition unit calculates, in response to reception of the abnormality notification, an offset amount common to the plurality of first voltage values based on the plurality of first voltage values, the preset range and the number of the battery cells included in each of the plurality of battery blocks. The offset addition unit produces a plurality of second voltage values by adding the offset amount to each of the plurality of first voltage values. The charge/discharge control unit limits the charge power of the secondary battery and the discharge power of the secondary battery based on the plurality of second voltage values produced by the offset addition unit.

Preferably, the offset addition unit sets the offset amount to zero when the offset addition unit senses ending of the output of the abnormality notification by the abnormality sensing unit.

Further preferably, the offset addition unit starts to decrease gradually the offset amount when the abnormality sensing unit ends the output of the abnormality notification.

Preferably, the offset addition unit adds a predetermined amount as the offset amount to each of the plurality of first voltage values, when the offset amount being calculated exceeds the predetermined amount.

Preferably, when the secondary battery is charged, the offset addition unit calculates, based on the maximum voltage value among the plurality of first voltage values and the number of the battery cells included in the battery block corresponding to the maximum voltage value among the plurality of battery blocks, an average value of the voltages of the battery cells included in the corresponding battery block and calculates the offset amount based on a difference between an upper limit value of the preset range and the average value as well as the number of the battery cells included in the corresponding battery block.

Preferably, when the secondary battery is discharged, the offset addition unit calculates, based on the minimum voltage value among the plurality of first voltage values and the number of the battery cells included in the battery block corresponding to the minimum voltage value among the plurality of battery blocks, an average value of the voltages of the battery cells included in the corresponding battery block and calculates the offset amount based on a difference between a lower limit value of the preset range and the average value as well as the number of the battery cells included in the corresponding battery block.

Preferably, the abnormality sensing unit stores, as the preset range, a first range and a second range including the first range, outputs a first notification as the abnormality notification when the abnormality sensing unit senses that the cell voltage value falls outside the first range, and outputs the first notification and a second notification as the abnormality notification when the abnormality sensing unit senses that the cell voltage value falls outside the second range.

Further preferably, the first range has a first upper limit value. The second range has a second upper limit value. During the charging of the secondary battery, the charge/discharge control unit decreases the charge power such that a decrease rate representing an amount of decrease of the charge power per unit time takes a first value when the cell voltage value is larger than the first upper limit value and smaller than the second upper limit value, and decreases the charge power such that the decrease rate takes a second value larger than the first value when the cell voltage value is larger than the second upper limit value.

Further preferably, the control device further includes a diagnosing unit. The diagnosing unit diagnoses the secondary battery as being in the overcharged state when the charge power is zero and the abnormality sensing unit outputs the first and second notifications.

More preferably, the first range has a first lower limit value. The second range has a second lower limit value. During the discharging of the secondary battery, the charge/discharge control unit decreases the discharge power such that a decrease rate representing an amount of decrease of the discharge power per unit time takes a first value when the cell voltage value is smaller than the first lower limit value and larger than the second lower limit value, and decreases the discharge power such that the decrease rate takes a second value larger than the first value when the cell voltage value is smaller than the second lower limit value.

Further preferably, the control device further includes a diagnosing unit. The diagnosing unit diagnoses the secondary battery as being in the overdischarged state when the discharge power is zero and the abnormality sensing unit outputs the first and second notifications.

Preferably, the plurality of battery cells include a lithium-ion battery.

According to the invention, when the abnormality that the voltage of one of the plurality of battery cells falls outside the predetermined range is sensed, the charge/discharge of the secondary battery is performed based on the voltage values that are obtained by adding the offset amount to the respective voltage values of the plurality of battery blocks of the secondary battery, and thereby the charge power or discharge power of the secondary battery is limited. Thereby, the electric power supplied to or from each battery cell is limited so that the deterioration of the secondary battery due to the overcharge or overdischarge can be suppressed.

BEST MODES FOR CARRYING OUT THE INVENTION

Embodiments of the invention will now be described with reference to the drawings. In the following description, the same or corresponding portions bear the same reference numbers, and description thereof is not repeated.

First Embodiment

Figure 1:
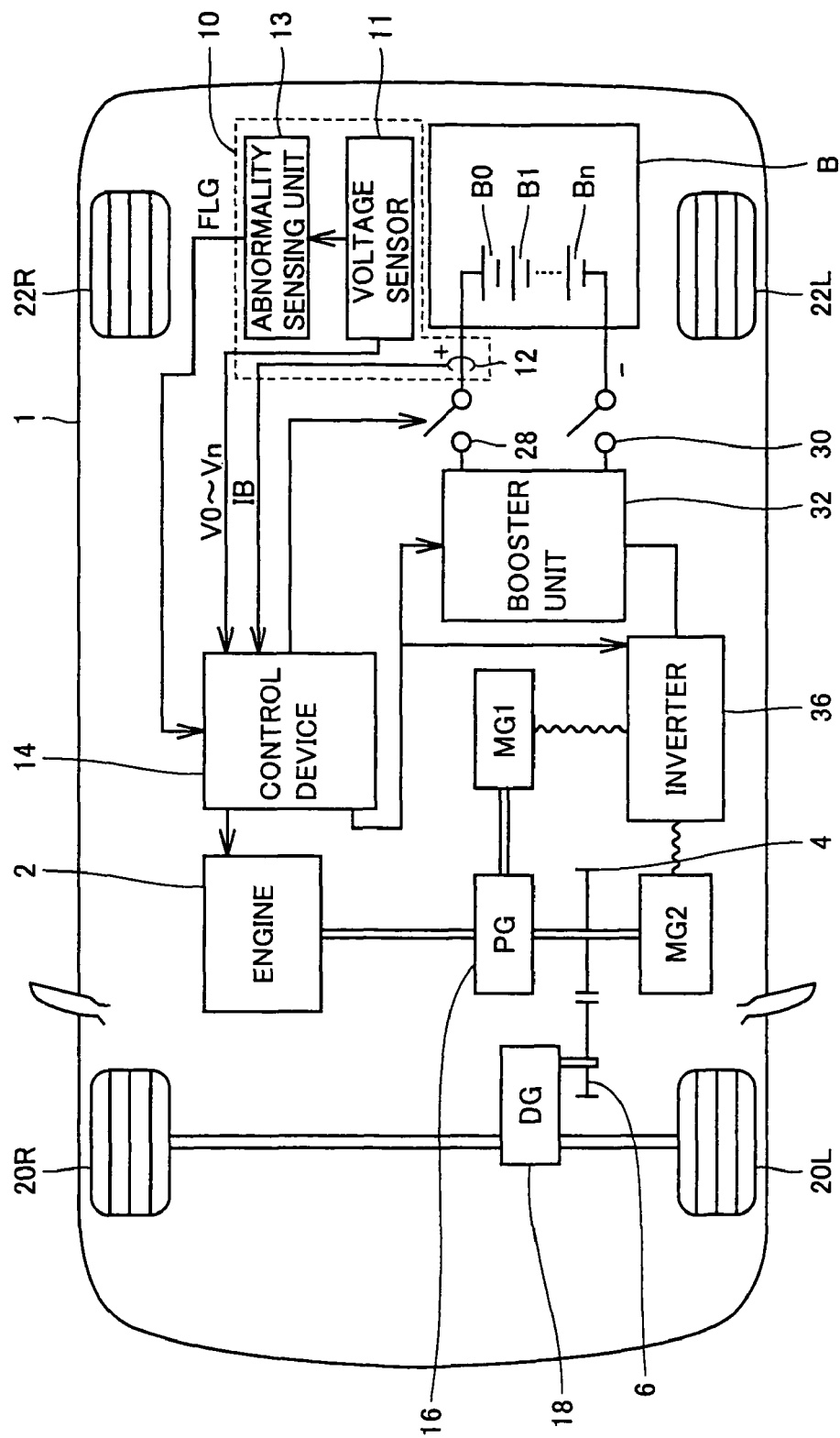
FIG. 1 shows a primary structure of a hybrid vehicle 1 of a first embodiment.

FIG. 1 shows a primary structure of a hybrid vehicle 1 of a first embodiment. Hybrid vehicle 1 uses an engine and an electric motor in combination for running. Referring to FIG. 1, hybrid vehicle 1 includes front wheels 20R and 20L, rear wheels 22R and 22L, an engine 2, a planetary gear 16, a differential gear 18, gears 4 and 6, and a control device 14.

Hybrid vehicle 1 further includes a battery B arranged on a rear portion of the vehicle, a monitor unit 10 monitoring a voltage and current of battery B, a booster unit 32 boosting a DC power supplied from battery B, an inverter 36 transmitting a DC power to/from booster unit 32, a motor generator MG1 that is coupled to engine 2 via planetary gear 16 for generating an electric power, and a motor generator MG2 having a rotation shaft connected to planetary gear 16. Inverter 36 is connected to motor generators MG1 and MG2, and performs conversion between an AC power and the DC power supplied from booster unit 32.

Planetary gear 16 has first, second and third rotation shafts. The first rotation shaft is connected to engine 2, the second rotation shaft is connected to motor generator MG1 and the third rotation shaft is connected to motor generator MG2.

The third rotation shaft is provided with a gear 4, which drives a gear 6 to transmit a drive power to differential gear 18. Differential gear 18 transmits the drive power received from gear 6 to front wheels 20R and 20L, and also transmits a rotation power of front wheels 20R and 20L to the third rotation shaft of the planetary gear.

Planetary gear 16 operates to split the drive power for engine 2 and motor generators MG1 and MG2. More specifically, when the rotations of two rotation shafts among the three rotation shafts of planetary gear 16 are determined, the rotation of the remaining one rotation shaft is forcedly determined. Therefore, engine 2 is controlled to operate in the most efficient region and, at the same time, motor generator MG2 is operated to control the vehicle speed by controlling the quantity of generated power of motor generator MG1 so that the automobile having good energy efficiency as a whole is achieved.

The vehicle may employ a reduction gear that reduces the speed of rotation of motor generator MG2 to be transmitted to planetary gear 16, and may also employ a speed-change gear that can vary a reduction ratio of the reduction gear.

Battery B includes a secondary battery such as a nickel hydrogen battery or a lithium-ion battery, supplies the DC power to booster unit 32 and is charged with the DC power supplied from booster unit 32. Battery B is a battery assembly, and includes a plurality of battery blocks B0-Bn, each of which includes a plurality of battery cells connected in series together.

Monitor unit 10 includes a voltage sensor 11, a current sensor 12 and an abnormality sensing unit 13. Voltage sensor 11 senses voltages V0-Vn of the plurality of battery blocks B0-Bn (which may also be referred to as "inter-terminal voltages" or "block voltages"), and provides a result of the sensing to control device 14. Current sensor 12 senses a current IB flowing to battery B, and provides a result of the sensing to control device 14. When the voltage value of one of the battery cells included in battery blocks B0-Bn falls outside the predetermined range, abnormality sensing unit 13 turns on a flag FLG to notify control device 14 of the abnormality.

Booster unit 32 boosts the DC voltage supplied from battery B, and supplies the boosted DC voltage to inverter 36. Inverter 36 converts the supplied DC voltage to an AC voltage, and thereby controllably drives motor generator MG1 in an engine starting operation. After the engine started, inverter 36 converts the AC power generated by motor generator MG1 to the AC power, of which voltage is changed by booster unit 32 to an appropriate voltage for charging battery B so that battery B is charged with the appropriate voltage.

Inverter 36 drives motor generator MG2. Motor generator MG2 assists engine 2 to drive front wheels 20R and 20L. In the braking operation, the motor generator performs a regenerative operation to convert rotation energy of the wheels to electric energy. The electric energy thus obtained returns to battery B via inverter 36 and booster unit 32. System main relays 28 and 30 connecting battery B to booster unit 32 during the driving of vehicle are arranged between booster unit 32 and battery B. When the vehicle is not operating, system main relays 28 and 30 are off and interrupt the high voltage.

Figure 2:
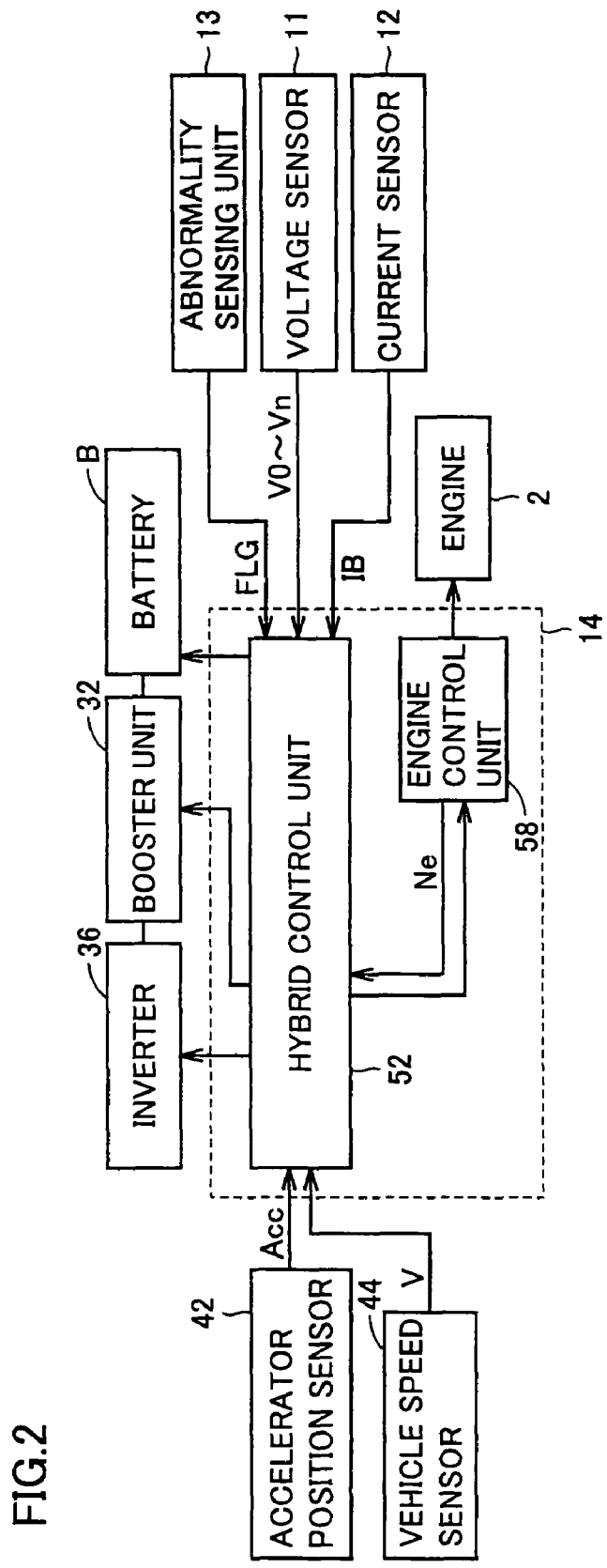
FIG. 2 shows functional blocks of a control device 14 in FIG. 1 and peripheral devices related to it.

According to driver's instructions and outputs of various sensors attached to the vehicle, control device 14 controls engine 2, inverter 36, booster unit 32 and system main relays 28 and 30, and also controls the charge/discharge of battery B FIG. 2 shows the functional blocks of control device 14 in FIG. 1 and peripheral devices related to it. Control device 14 may be implemented by either software or hardware. Referring to FIG. 2, control device 14 includes a hybrid control unit 52 and an engine control unit 58.

Engine control unit 58 performs throttle control of engine 2, and also senses an engine revolution speed Ne of engine 2 to transmit it to hybrid control unit 52.

Hybrid control unit 52 calculates an output (requested power) requested by the driver based on an output signal Acc of an accelerator position sensor 42 and a vehicle speed V detected by a vehicle speed sensor 44. In addition to this driver-requested power, hybrid control unit 52 calculates a drive power (total power) that is required in view of the state of charge of battery B, and further calculates the revolution speed and the power that are requested to the engine.

Hybrid control unit 52 transmits the requested revolution speed and requested power to engine control unit 58, which performs the throttle control of engine 2.

Hybrid control unit 52 calculates the driver-requested torque according to the running state, and causes inverter 36 to drive motor generator MG2 and, when necessary, to operate motor generator MG1 for the power generation.

The drive power of engine 2 is split into a portion for directly driving the wheels and a portion for driving motor generator MG1. A sum of the drive power of motor generator MG2 and the power for the direct drive by the engine becomes the drive power of the vehicle.

Hybrid control unit 52 calculates the State Of Charge (SOC) of battery B based on voltage values V0-Vn received from voltage sensor 11 as well as current value IB received from current sensor 12 and the like. Hybrid control unit 52 controls booster unit 32 and inverter 36 to charge or discharge battery B based on the calculated SOC. Hybrid control unit 52 executes the charge/discharge control to be described later when flag FLG is turned on.

Figure 3:
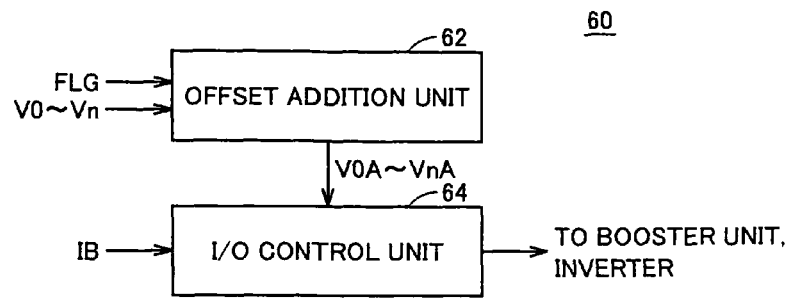
FIG. 3 is a functional block diagram showing a structure of a battery control unit 60 included in a hybrid control unit 52 shown in FIG. 2.

FIG. 3 is a functional block diagram showing a structure of a battery control unit 60 included in hybrid control unit 52 shown in FIG. 2. Referring to FIG. 3, battery control unit 60 includes an offset addition unit 62 and an I/O control unit 64.

Offset addition unit 62 receives voltage values V0-Vn and flag FLG. When flag FLG is on, offset addition unit 62 calculates the offset value. Offset addition unit 62 adds the offset value to each of voltage values V0-Vn, and outputs voltage values V0A-VnA.

I/O control unit 64 receives current value IB as well as voltage values V0A-VnA provided from offset addition unit 62, sets the limit value of the electric power supplied to/from battery B and controls inverter 36 and booster unit 32 based on the limit value thus set.

Figure 4:
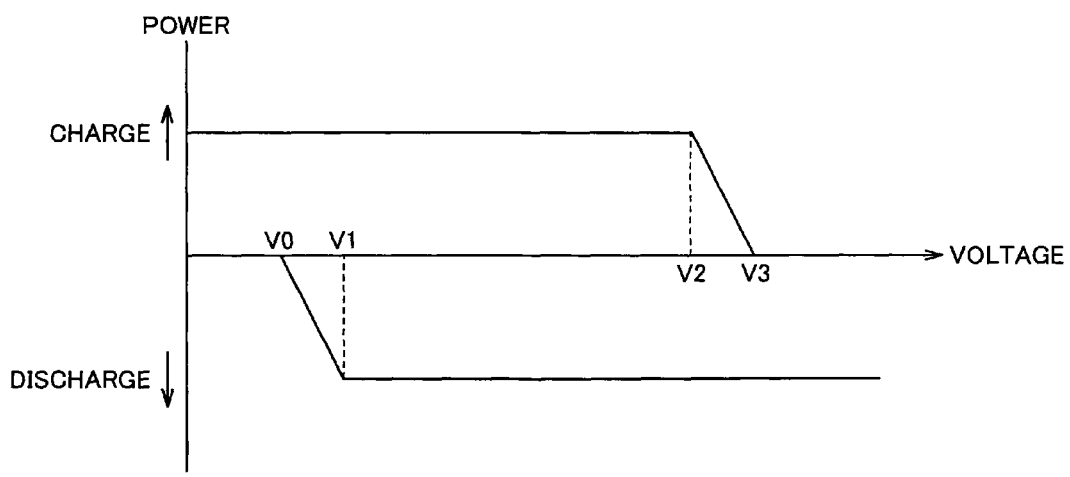
FIG. 4 shows a relationship between a limit value of the electric power supplied to/from a battery B and a voltage of the battery.

FIG. 4 shows a relationship between the limit value of the electric power supplied to/from battery B and the voltage of battery B. As shown in FIG. 4, when the voltage value is larger than V1 during the discharging of battery B, a certain limit value is set in view of an output density and the like of the battery. However, when the voltage value is smaller than V1 during the charging of battery B, the discharge quantity is restricted. When the voltage value is smaller than lower limit value V0 (V0<V1), the discharge is inhibited. Likewise, when the voltage value is in a region smaller than V2 during the charging of battery B, a certain limit value is set in view of the charge capacity and the like of the battery. However, in the region where the voltage value is larger than V2, the charge quantity is restricted. When the voltage value is larger than an upper limit value V3 (V3>V2), the charging is inhibited.

During the charging of battery B, I/O control unit 64 sets the charge quantity based on the block voltage containing the added offset so that the block voltage provided to I/O control unit 64 is higher than the actual voltage. Thereby, the limit value set by I/O control unit 64 becomes small so that the charge quantity of battery B is restricted.

During the discharging of battery B, I/O control unit 64 likewise sets the discharge quantity based on the block voltage containing the added offset so that the block voltage provided to I/O control unit 64 becomes lower than the actual voltage. Thereby, the limit value set by I/O control unit 64 becomes small so that the discharge quantity of battery B is restricted.

Figure 5:
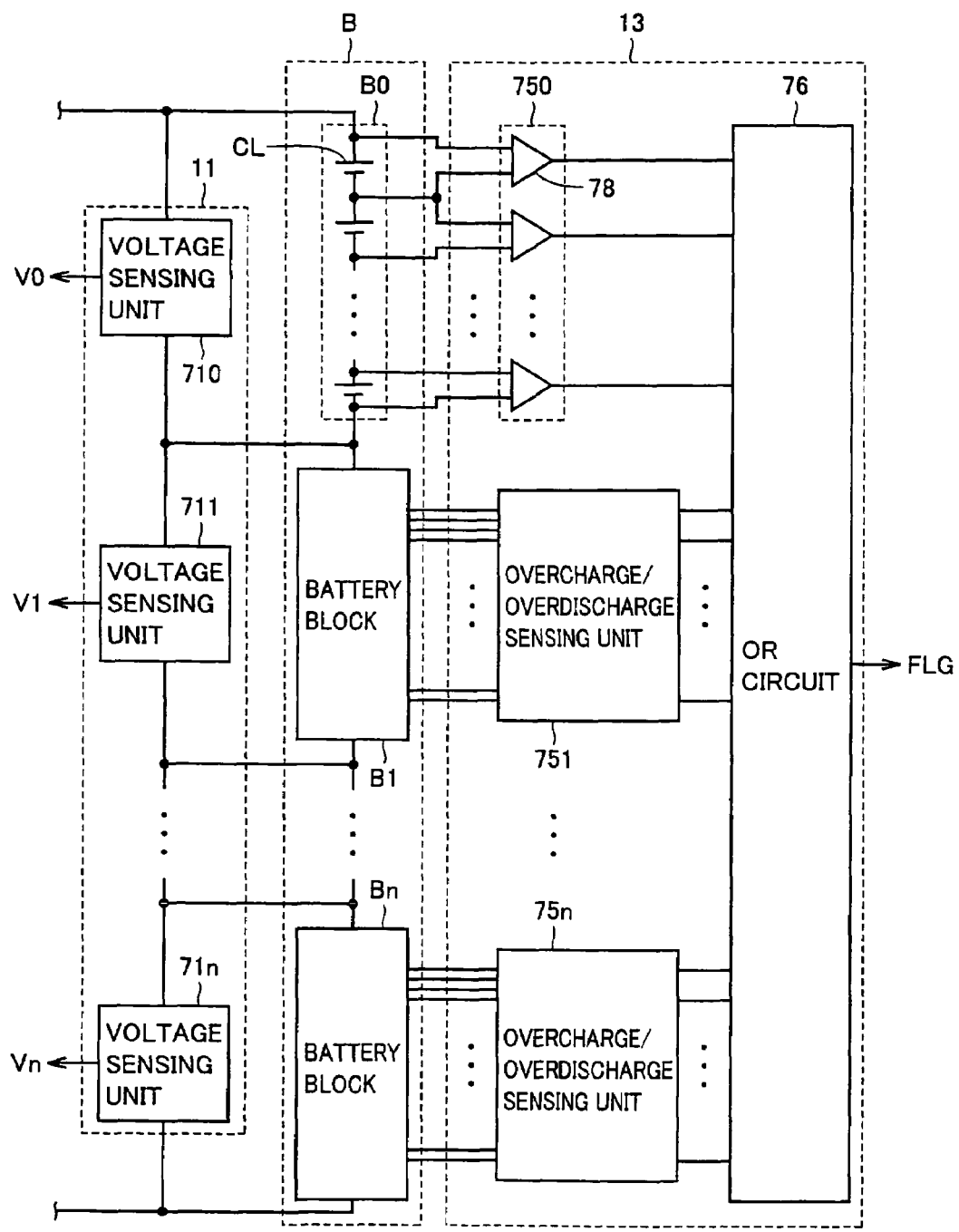
FIG. 5 specifically illustrates battery B mounted on hybrid vehicle 1 and its peripheral structures.

FIG. 5 specifically illustrates battery B mounted on hybrid vehicle 1 and its peripheral structures. Referring to FIG. 5, battery B includes the plurality of battery blocks B0-Bn connected together in series. Battery blocks B1-Bn have substantially the same structure as battery block B0, and therefore description thereof is not repeated.

Voltage sensor 11 includes voltage sensing units 710-71n that are arranged corresponding to battery blocks B0-Bn for sensing the voltages of the corresponding battery blocks, respectively. Voltage sensing units 710-71n output voltage values V0-Vn, respectively.

Abnormality sensing unit 13 includes overcharge/overdischarge sensing units 750-75n corresponding to battery blocks B0-Bn, respectively, and an OR circuit 76 that performs a logical OR operation between the outputs of overcharge/overdischarge sensing units 750-75n. Overcharge/overdischarge sensing unit 750 includes a plurality of abnormality determining units 78 corresponding to a plurality of battery cells CL, respectively. Each abnormality determining unit 78 changes a logical value of its output from "0" to "1" for indicating that the corresponding battery cell CL is abnormal, when the voltage value of corresponding battery cell CL is larger than the upper limit value or when it is smaller than the lower limit value. Overcharge/overdischarge sensing units 751-75n have substantially the same structures as overcharge/overdischarge sensing unit 750, and therefore description thereof is not repeated.

When any one of abnormality determining units 78 produces the output of "1" in logical value, OR circuit 76 turns on flag FLG (i.e., sets the logical value of flag FLG to "1"). Otherwise, i.e., when all the abnormality determining units 78 produce the outputs of "0" in local value, OR circuit 76 turns off flag FLG (i.e., sets the logical value of flag FLG to "0").

Figure 6:
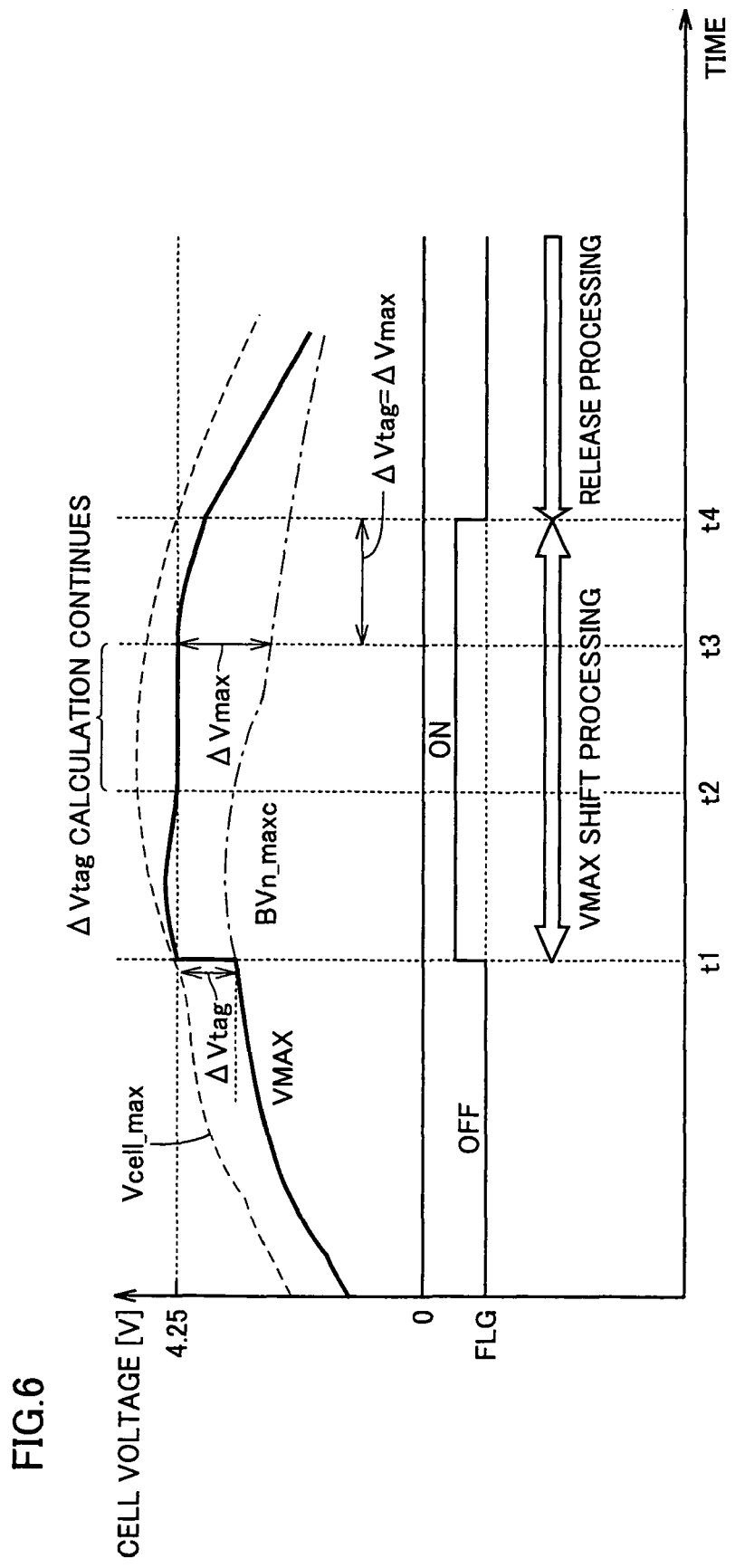
FIG. 6 illustrates control of a battery control unit 60 during charging of battery B.

FIG. 6 illustrates control of battery control unit 60 during the charging of battery B. In FIG. 6, the abscissa of the graph gives the cell voltage, and the ordinate gives the time. A voltage value BVn_maxc is an average value of the cell voltages that are obtained by dividing the maximum voltage value among voltage values V0-Vn by the number of the cells included in one battery block. A voltage value VMAX is obtained by adding the offset value per battery cell to voltage value BVn_maxc, and is updated to a value of 4.25 V or higher in response to the turning on of flag FLG. Thus, voltage value VMAX is equal to voltage value BVn_maxc before a time t1 because the offset value is zero (flag FLG is off). During the charging of battery B, the offset value is set positive.

The cell voltage rises with charging of battery B. A voltage value Vcell_max is the maximum value among the voltage values of the plurality of battery cells. However, voltage value Vcell_max is not measured in this embodiment (and the voltage values are measured a battery block at a time, i.e., on a block-by-block basis). When voltage value Vcell_max reaches the upper limit (4.25 V) at time t1, flag FLG is turned on. When offset addition unit 62 senses the turn-on of flag FLG at time t1, it calculates a voltage difference ΔVtag that is a difference between the upper limit (4.25 V) and voltage value BVn_maxc. Voltage difference ΔVtag corresponds to the offset value per battery cell.

Offset addition unit 62 adds the offset value obtained by (ΔVtag×(the number of battery cells per battery block)) to each of voltage values V0-Vn, and thereby outputs voltage values V0A-VnA, respectively. This offset value shifts the cell voltage to 4.25 V. I/O control unit 64 performs the charge control of the battery based on voltage values V0A-VnA. When this processing is performed during a period between times t1 and t2, I/O control unit 64 restricts and decreases gradually the charge power supplied to the battery so that voltage value VMAX will finally lowers to the upper the upper limit value of 4.25 V although voltage value VMAX temporarily rises.

During a period between times t2 and t3, flag FLG is on so that offset addition unit 62 continues the calculation of voltage difference ΔVtag and the calculation of the offset value (i.e., the product of ΔVtag and the number of cells per block) of voltage values V0-Vn. Since voltage difference ΔVtag is calculated at predetermined intervals, voltage value VMAX is updated. However, the relationships of (ΔVtag=(4.25−BVn_maxc)) and (VMAX=(BVn_maxc+ΔVtag)) are present so that voltage value VMAX is equal to 4.25 V.

During a period between times t3 and t4, flag FLG is on so that offset addition unit 62 calculates voltage difference ΔVtag and the offset value of voltage values V0-Vn. During the period between times t3 and t4, voltage difference ΔVtag is calculated at predetermined intervals. However, an upper limit is set for voltage difference ΔVtag, and voltage difference ΔVtag reaches a predetermined maximum value ΔVmax (e.g., of 0.2 V) at time t3. Thereafter, voltage value BVn_maxc and voltage value VMAX lower while keeping a difference equal to maximum value ΔVmax between voltage value BVn_maxc and voltage value VMAX.

When the upper limit is not present for voltage difference ΔVtag, voltage value VMAX is kept at 4.25 V so that the limit value of the electric power supplied to the battery for charging remains small. In this case, the braking force produced by the regenerative drive of the motor generator in the braking operation of the vehicle is small, and the energy quantity obtained by the regenerative drive of the motor generator is likewise small. Thus, the kinetic energy of the vehicle cannot be collected effectively. When the upper limit is set for voltage difference ΔVtag, VMAX lowers with lowering of voltage value BVn_maxc. The lowering of voltage value VMAX means the lowering of each of voltage values V0A-VnA. The I/O control unit increases the limit value of the electric power supplied to the battery for charging by the lowering of each of voltage values V0A-VnA. Therefore, the lowering of voltage value BVn_maxc can increase the electric power supplied to the battery for charging. Therefore, the foregoing problem can be prevented.

After time t4, offset addition unit 62 gradually decreases the offset value toward 0. Thereby, voltage value VMAX gradually approaches voltage value BVn_maxc.

When voltage value Vcell_max reaches a predetermined voltage value slightly smaller than 4.25 V at time t4, flag FLG is turned off. The cell voltage value attained when flag FLG is turned off is different from that attained when flag FLG is turned on, and thereby the state of flag FLG can be fixed to the on or off state even when the cell voltage value minutely varies near the upper limit value.

By setting the offset value to 0, the charging of the battery can be controlled such that the maximum range of voltage value VMAX matches a preset range (i.e., a voltage value range in which the flag FLG is off). Therefore, the capability of the battery can be effectively used.

When the offset value is set to 0 (i.e., voltage value ΔVtag is set to 0), simultaneously with the turn-off of flag FLG, the limit value determined by I/O control unit 64 changes discontinuously so that the operations of booster unit 32 and inverter 36 may change rapidly. When flag FLG is turned off, offset addition unit 62 changes voltage difference ΔVtag toward 0 over a certain time. By gradually changing the offset value, discontinuous changes in limit value determined by I/O control unit 64 can be prevented so that it is possible to prevent discontinuous changes in electric power supplied to battery B. Thereby, it is possible, e.g., to prevent significant changes in behavior of the vehicle and to protect inverter 36 and booster unit 32. The amount of decrease of voltage difference ΔVtag is preferably proportional to the time that elapses after flag FLG is turned off.

The processing shown in FIG. 6 can be summarized as follows. The processing that is executed during a period between times t1 and t4 in response to the on state of the overcharge flag is VMAX shift processing that shifts voltage value VMAX. The processing executed after time t4 in response to the off state of the overcharge flag is release processing for releasing the shift of voltage value VMAX.

Figure 7:
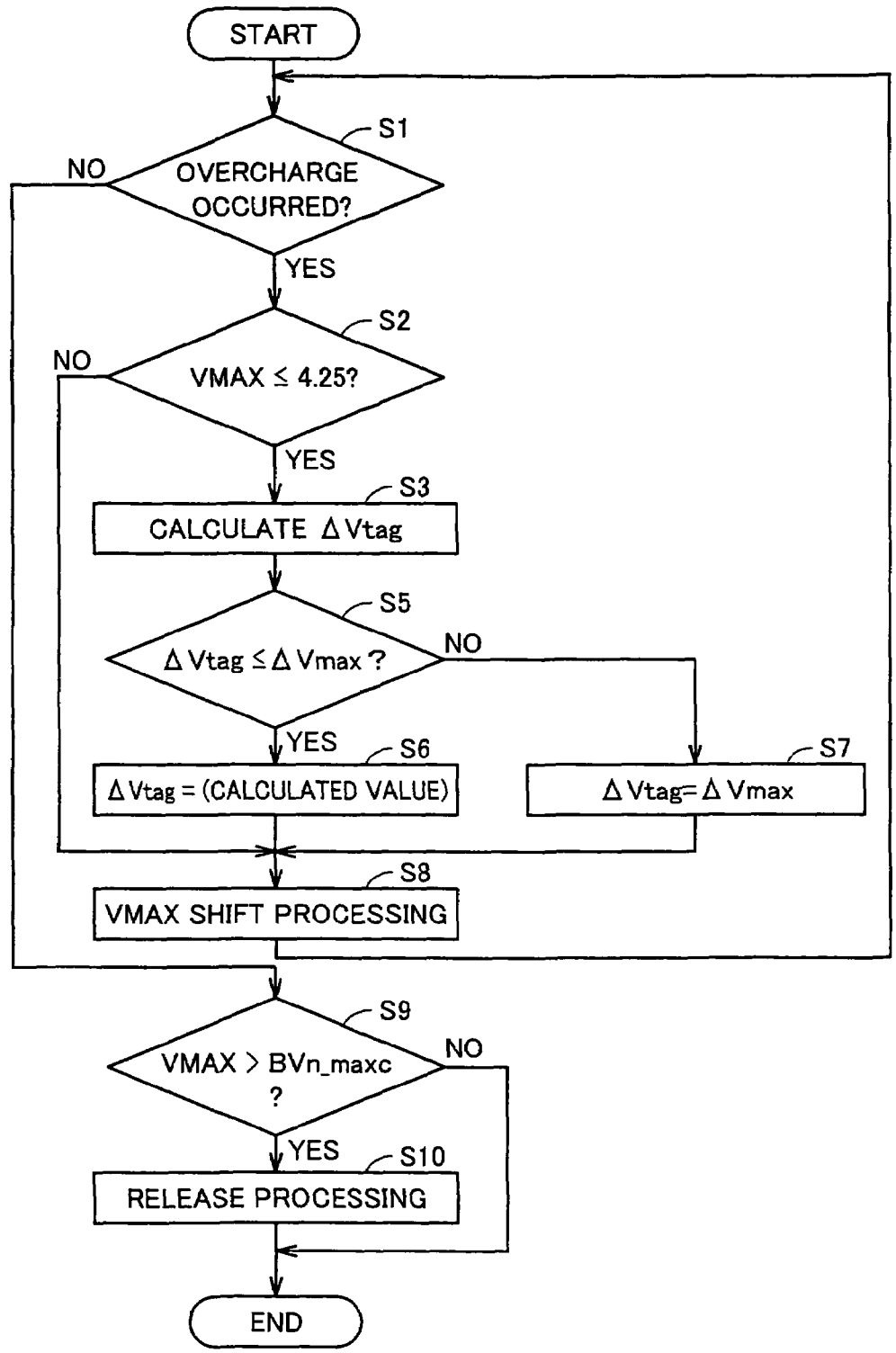
FIG. 7 is a flowchart illustrating charge control processing shown in FIG. 6.

FIG. 7 is a flowchart illustrating the charge control processing shown in FIG. 6. Referring to FIGS. 7 and 3, offset addition unit 62 determines based on flag FLG whether the battery cell is overcharged or not, in step S1. When flag FLG is on, i.e., when the battery cell is overcharged (YES in step S1), offset addition unit 62 determines whether voltage value VMAX is equal to or smaller than 4.25 V, or not (step S2). When flag FLG is off, i.e., when the battery cell is not overcharged (NO in step S1), the processing in step S9 to be described later is executed.

When voltage value VMAX is equal to or smaller than 4.25 V (YES in step S2), offset addition unit 62 calculates voltage difference ΔVtag (step S3). When voltage value VMAX is larger than 4.25 V (NO in step S2), it is not necessary to calculate newly voltage difference ΔVtag, and the processing in step S8 to be described later is executed using last calculated voltage difference ΔVtag.

In step S5 following step S3, offset addition unit 62 determines whether voltage difference ΔVtag calculated in step S3 is equal to or smaller than maximum value ΔVmax, or not. When voltage difference ΔVtag is equal to or smaller than maximum value ΔVmax (YES in step S5), voltage difference ΔVtag is set to the value calculated in step S3 (step S6). When voltage difference ΔVtag in step S3 exceeds maximum value ΔVmax (NO in step S5), voltage difference ΔVtag is set to maximum value ΔVmax (step S7). When the processing in either step S6 or S7 ends, offset addition unit 62 performs the VMAX shift processing that adds the offset value determined by voltage difference ΔVtag and the number of cells of the battery block to voltage values V0-Vn (step S8). I/O control unit 64 performs the charge control based on voltage values V0A-VnA received from offset addition unit 62.

In step S9, offset addition unit 62 determines whether voltage value VMAX is larger than voltage value BVn_maxc or not. The determination in step S1 that the battery cell is not overcharged can be made when the battery cell has not entered the overcharged state, and can also be made when the battery cell has been restored from the overcharged state.

When the battery cell has not entered the overcharged state, the VMAX shift processing has not been performed so that voltage value VMAX is equal to voltage value BVn_maxc. In this case (NO in step S9), therefore, the whole processing ends. Conversely, when the battery cell has been restored from the overcharged state, voltage value VMAX is larger than voltage value BVn_maxc. In this case (YES in step S9), therefore, the release processing is performed (step S10). It is noted that, in this case, I/O control unit 64 likewise performs the charge control based on voltage values V0A-VnA received from offset addition unit 62. When the processing in step S10 ends, the whole processing ends.

Referring to FIGS. 6 and 7, one certain cell is overdischarged during a period between times t1 and t2, and voltage value VMAX is larger than 4.25 V. During this period, the processing is performed in the order of steps S1, S2, S3, S5, S6 and S8, and then the processing in steps S1, S2 and S8 continues so that voltage value VMAX becomes equal to or larger than the upper limit value of 4.25 V.

During the period between times t2 and t3, the above overcharge continues, and the offset value calculated during the period between times t1 and t2 sets voltage value VMAX equal to or smaller than 4.25 V. During this period, therefore, the processing in steps S1, S2, S3, S5, S6 and S8 is executed, and the VMAX shift processing is executed. However, voltage value VMAX keeps 4.25 V as described above.

During the period between times t3 and t4, the overcharge continues, and the offset value calculated during the period between times t2 and t3 sets voltage value VMAX equal to or smaller than 4.25 V similarly to the above processing. However, voltage difference ΔVtag reaches maximum value ΔVmax. During this period, therefore, the processing in steps S1, S2, S3, S5, S7 and S8 is executed, and the VMAX shift processing is executed. Consequently, voltage value VMAX and voltage value BVn_maxc keep a difference of maximum value ΔVmax between them.

After time t4, the above overcharge does not occur, and voltage value VMAX is larger than voltage value BVn_maxc. Therefore, the processing is performed in the order of steps S1, S9 and S10, and the release processing is executed. Consequently, voltage value VMAX slowly approaches voltage value BVn_maxc.

Figure 8:
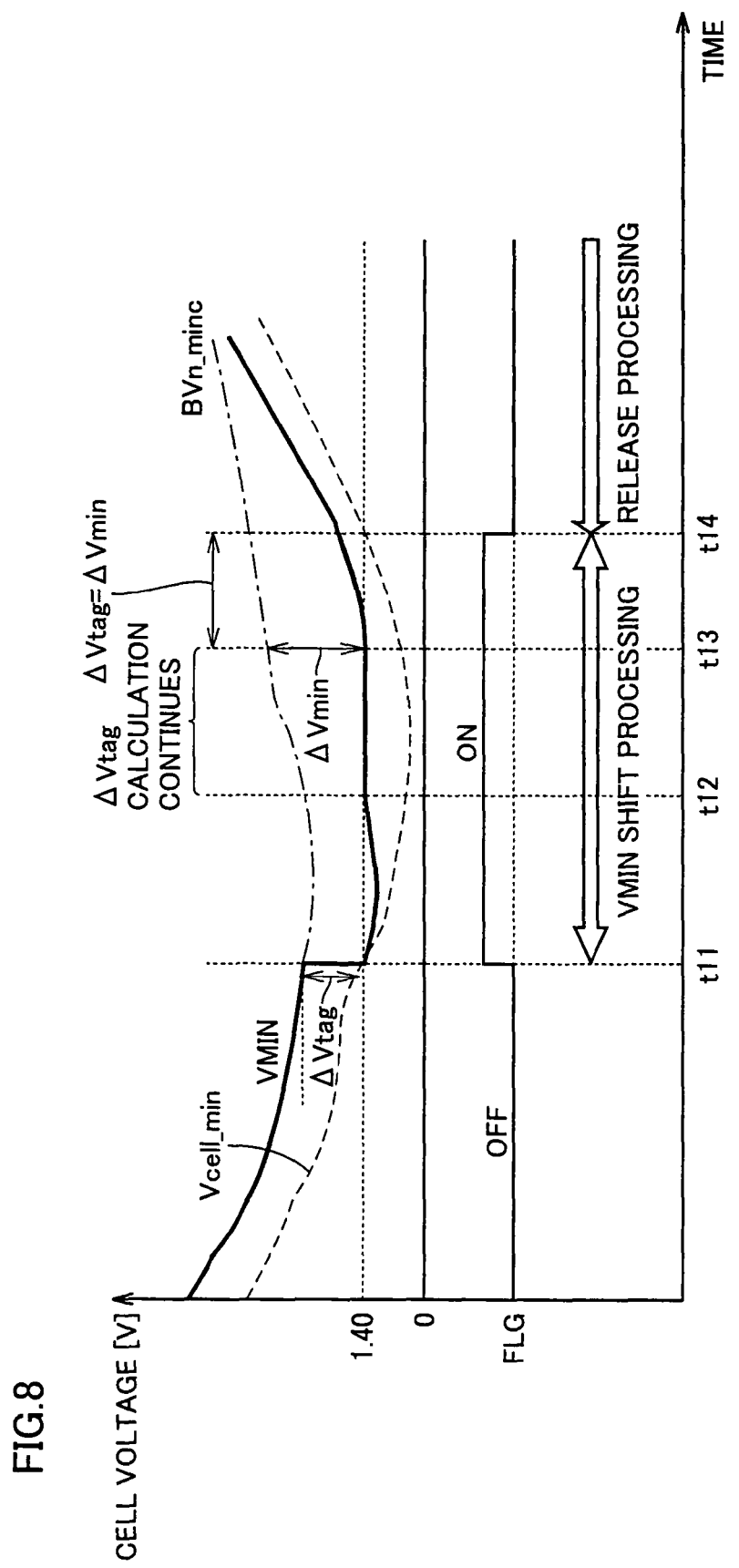
FIG. 8 illustrates control of battery control unit 60 during discharging of battery B.

FIG. 8 illustrates the control of battery control unit 60 during the discharging of battery B. FIG. 8 can be contrasted with FIG. 6. Referring to FIGS. 8 and 6, voltage values Vcell_min, BVn_minc and VMIN shown in FIG. 8 correspond to voltage values Vcell_max, BVn_maxc and VMAX shown in FIG. 6, respectively.

Voltage value Vcell_min is the minimum value among the voltage values of the plurality of battery cells. Voltage value BVn_minc is an average value of the cell voltages that is obtained by dividing the minimum voltage value among voltage values V0-Vn by the number of cells included in one battery block. Voltage value VMIN is obtained by subtracting the offset value (voltage difference ΔVtag) per battery cell from voltage value BVn_minc, and is updated to a value equal to 1.40 V or lower corresponding to the turn-on of flag FLG. Thus, before time t11, the offset value is 0 (flag FLG is off) so that voltage value VMIN is equal to voltage value BVn_minc.

The lower limit of the cell voltage is set to 1.40 V, and a relationship of (ΔVtag=BVn_minc−1.40) is established. Voltage difference ΔVtag is positive.

At time t11, voltage value Vcell_max reaches the lower limit value of 1.40 V so that flag FLG is turned on. When offset addition unit 62 senses the turn-on of flag FLG at time t1, it calculates voltage difference ΔVtag, adds the negative offset value (−ΔVtag×(the number of battery cells per battery block)) to each of voltage values V0-Vn, and outputs voltage values V0A-VnA. This offset value shifts the cell voltage to 1.40 V. I/O control unit 64 controls the discharge of the battery based on voltage values V0A-VnA. According to the above processing, I/O control unit 64 restricts the discharge power of the battery to decrease gradually during the period between times t11 and t12 so that voltage value VMIN temporarily lowers, but will finally rise to the lower limit value of 1.40 V.

During the period between times t12 and t13, flag FLG is on so that offset addition unit 62 continues to calculate voltage difference ΔVtag and the offset value (the product of ΔVtag and the number of cells per block) of voltage values V0-Vn. During the period between times t12 and t13, voltage difference ΔVtag is calculated at predetermined intervals. During the period between times t12 and t13, however, ΔVtag is equal to (BVn_minc−1.40) and VMIN is equal to (BVn_minc−ΔVtag) similarly to the charging processing so that voltage value VMIN is 1.40 V.

During the period between times t13-t14, flag FLG is off so that offset addition unit 62 calculates voltage difference ΔVtag and the offset value of voltage values V0-Vn. During the period between times t13 and t14, voltage difference ΔVtag is likewise calculated at predetermined intervals. Similarly to the charging processing, the upper limit is set for voltage difference ΔVtag, and voltage difference ΔVtag reaches a predetermined maximum lowering amount ΔVmin, e.g., of 0.2 V with respect to voltage value BVn_minc. Voltage values BVn_minc and VMIN rise while the difference equal to maximum lowering amount ΔVmin is kept between voltage value VMIN and voltage value BVn_minc.

By setting the upper limit for voltage difference ΔVtag similarly to the charging processing, the power can be taken out in accordance with rising of voltage value BVn_minc. Therefore, the power can be taken out even from the battery containing the overdischarged cell when the other cells are normal.

After time t14, offset addition unit 62 gradually decreases the offset value toward 0 so that voltage value VMIN slowly approaches voltage value BVn_minc. This allows effective use of the battery capacity. When flag FLG is tuned off at time t14, offset addition unit 62 changes voltage difference ΔVtag toward 0 over a certain time. This can prevent discontinuous changes in electric power supplied from battery B so that large changes in behavior of the vehicle can be prevented, and inverter 36 and booster unit 32 can be protected.

The processing shown in FIG. 8 can be summarized as follows. The processing executed during the period between times t11 and t14 in response to the on state of the overdischarge flag is VMIN shift processing that shifts voltage value VMIN. The processing executed after time t14 in response to the off state of the overdischarge flag is release processing for releasing the shift of voltage value VMIN.

Figure 9:
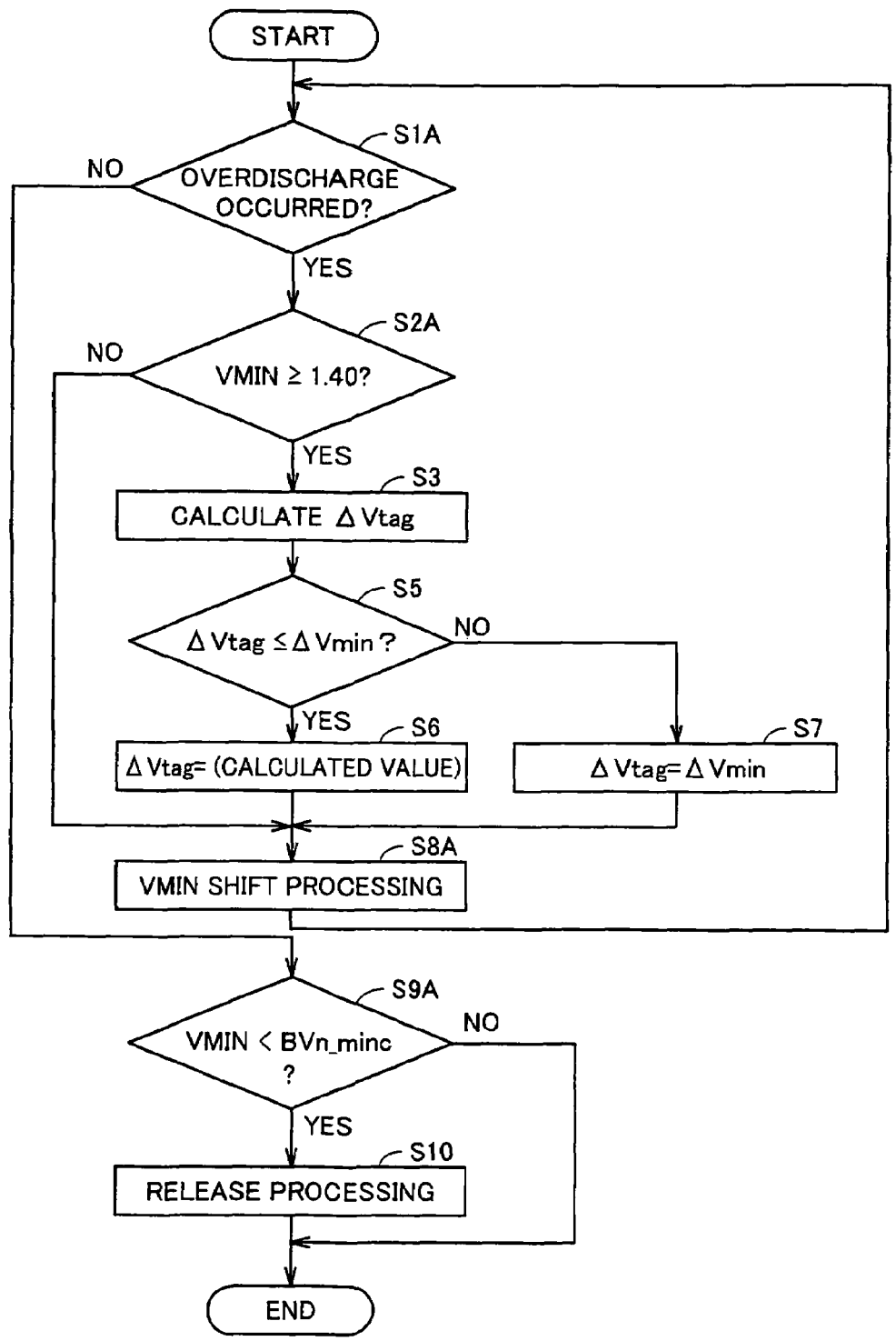
FIG. 9 is a flowchart illustrating discharge control processing shown in FIG. 8.

FIG. 9 is a flowchart illustrating the discharge control processing shown in FIG. 8. Referring to FIGS. 9 and 7, the processing in steps S1A, S2A, S8A and S9A shown in the flowchart of FIG. 9 is executed instead of the processing in steps S1, S2, S8 and S9 in FIG. 7. This is the difference in processing of offset addition unit 62 between the discharging and the charging. The processing in steps S5 and S7 in the flowchart of FIG. 9 is the same as that in steps S5 and S7 in the flowchart of FIG. 7 except for that maximum value ΔVmax in FIG. 7 is replaced with maximum lowering amount ΔVmin in FIG. 9. The processing in the other steps in the flowchart of FIG. 9 is substantially the same as that in the corresponding steps in the flowchart of FIG. 7. The following description will be primarily given on the processing in steps S1A, S2A, S8A and S9A. I/O control unit 64 performs the discharge control based on voltage values V0A-VnA received from offset addition unit 62.

In step S1A, offset addition unit 62 determines based on flag FLG whether the battery cell is overdischarged or not. When flag FLG is on, i.e., when the battery cell is overdischarged (YES in step S1A), offset addition unit 62 determines whether voltage value VMIN is equal to or larger than 1.40 V, or not (step S2A). When flag FLG is off, i.e., when the battery cell is not overdischarged (NO in step S1A), the processing in step S9A to be described later is executed.

When voltage value VMIN is equal to or larger than 1.40 V (YES in step S2A), offset addition unit 62 calculates voltage difference $\Delta$Vtag (step S3). When voltage value VMIN is smaller than 1.40 V (NO in step S2A), it is not necessary to calculate newly voltage difference $\Delta$Vtag, and the processing in step S8A to be described later is executed using last calculated voltage difference $\Delta$Vtag.

In step S9A, offset addition unit 62 determines whether voltage value VMIN is smaller than voltage value BVn_minc or not. The determination in step S1A that the battery cell is not overdischarged can be made when the battery cell has not entered the overdischarged state, and can also be made when the battery cell has been restored from the overdischarged state. When the battery cell has not entered the overdischarged state, the VMIN shift processing has not been performed so that voltage value VMIN is equal to voltage value BVn_minc. In this case (NO in step S9A), therefore, the whole processing ends. Conversely, when the battery cell has been restored from the overdischarged state, voltage value VMIN is smaller than voltage value BVn_minc. In this case (YES in step S9A), therefore, the release processing is performed (step S10). When the processing in step S10 ends, the whole processing ends.

Referring to FIGS. 8 and 9, one certain cell is overdischarged during a period between times t11 and t12, and voltage value VMIN is smaller than 1.40 V. During this period, the processing is performed in the order of steps S1A, S2A, S3, S5, S6 and S8A, and then the processing in steps S1A, S2A and S8A continues so that voltage value VMIN becomes equal to or smaller than the lower limit value of 1.40 V.

During the period between times t12 and t13, the above overcharge continues, and the offset value calculated during the period between times t11 and t12 sets voltage value VMIN equal to or larger than 1.40 V. During this period, therefore, the processing in steps S1A, S2A, S3, S5, S6 and S8A is executed, and the VMIN shift processing is executed. However, voltage value VMIN keeps 1.40 V as described above.

During the period between times t13 and t14, the overdischarge continues, and the offset value calculated during the period between times t12 and t13 sets voltage value VMIN equal to or larger than 1.40 V similarly to the above processing. However, voltage difference $\Delta$Vtag reaches maximum lowering amount $\Delta$Vmin. During this period, therefore, the processing in steps S1A, S2A, S3, S5, S7 and S8A is executed, and the VMIN shift processing is executed. Consequently, voltage value VMIN and voltage value BVn_minc keep a difference of maximum lowering amount $\Delta$Vmin between them.

After time t14, the above overdischarge does not occur, and voltage value VMIN is smaller than voltage value BVn_minc. Therefore, the processing is performed in the order of steps S1A, S9A and S10, and the release processing is executed. Consequently, voltage value VMIN slowly approaches voltage value BVn_minc.

According to the first embodiment, as described above, the control device for the secondary battery includes abnormality sensing unit 13 that performs the abnormality notification (i.e., turns on flag FLG) when it senses that the voltage value of one of the battery cells falls outside the preset range from 1.4 V to 4.25 V. The control device for the secondary battery also includes offset addition unit 62 that responds to the above abnormality notification by calculating the offset amount based on voltage values V0-Vn, the number of battery cells included in battery blocks B0-Bn and the preset range, and adding the offset amount to voltage values V0-Vn for outputting voltage values V0A-VnA. The control device further includes I/O control unit 64 that controls the charge/discharge of the battery based on voltage values V0A-VnA.

For protecting the battery, it is preferable to determine, on a cell-by-cell basis, whether the voltage value falls within the range between the upper and lower limits or not, and to perform the control such that the voltage value of the cell falls within the range. However, when the voltage sensor is arranged for each cell, the voltage sensors increase in number and therefore increase the cost. If abnormality sensing unit 13 is not employed, the presence of the overcharged or overdischarged cell cannot be sensed in the case where a certain battery block includes the cell having the voltage value exceeding the upper limit value, but exhibits the normal voltage value due to the variations in voltage value among the plurality of battery cells.

The first embodiment employs abnormality sensing unit 13 that senses the overcharge (or overdischarge) occurring in at least one of the battery cells, and controls the charge/discharge of the battery based on the value obtained by adding the offset value to the voltage values of voltage sensor 11 when flag FLG is turned on. Thereby, even when the battery voltage is sensed a battery block at a time (i.e., on a block-by-block basis), the voltage value can be controlled a cell at a time (i.e., on a cell-by-cell basis). Therefore, it is possible to suppress the deterioration of the battery due to the overcharge or overdischarge.

The control device of the secondary battery of the first embodiment can be applied to the nickel hydrogen battery and the lithium-ion battery. Particularly, in the lithium-ion battery, the rising of temperature lowers the charge efficiency only to a small or slight extent so that large variations are liable to occur in voltage among the plurality of cells. In the lithium-ion battery, therefore, it is required to monitor each cell for determining whether it is in the overcharged state or overdischarged state, or not. The control device for the secondary battery of the embodiment can be used for the secondary battery that requires the voltage management on the cell-by-cell basis, and can perform the voltage management (protection of the battery cell) on the cell-by-cell basis while suppressing the increase in cost.

Second Embodiment

Figure 10:
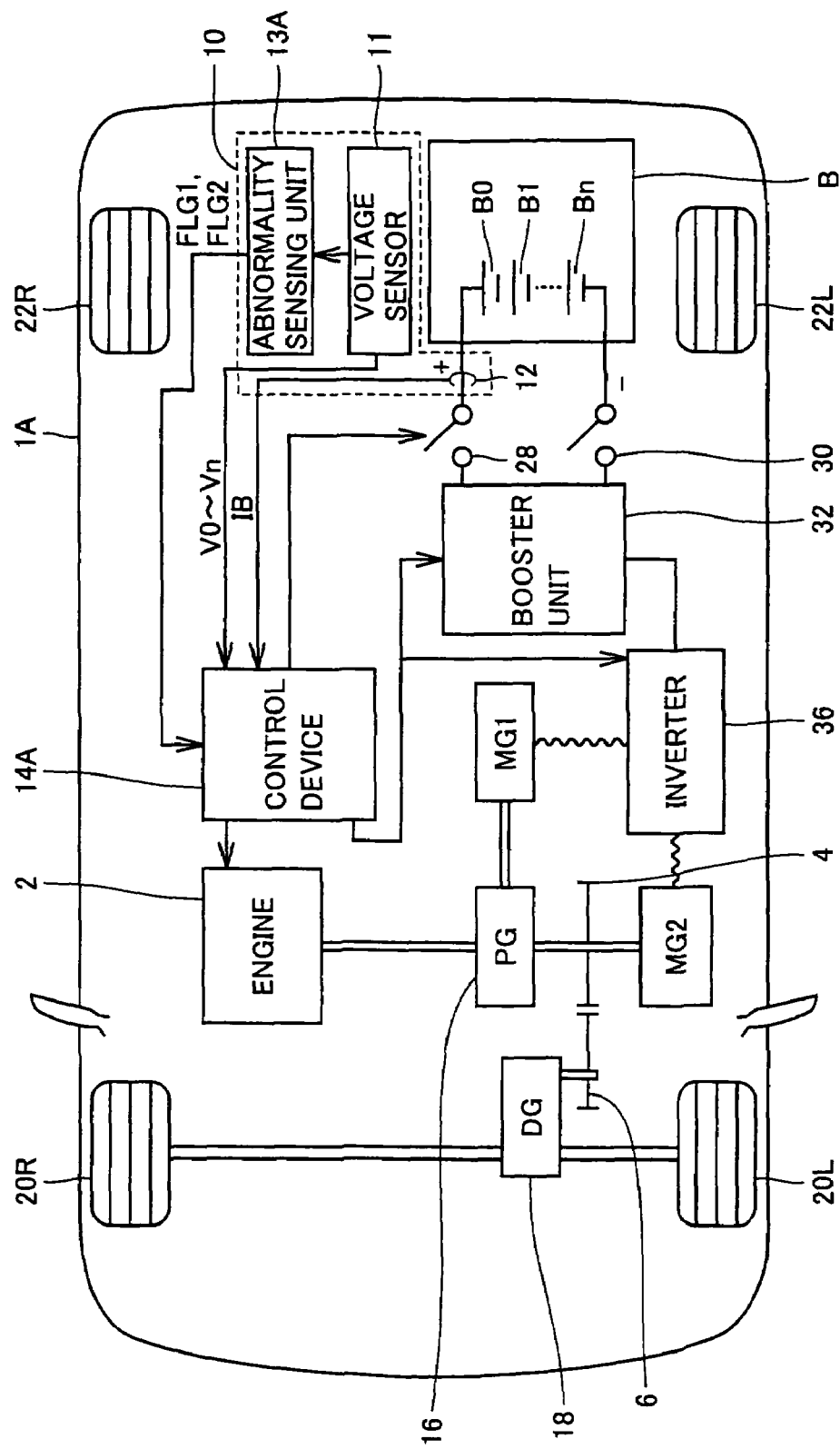
FIG. 10 shows a primary structure of a hybrid vehicle 1A of a second embodiment.

FIG. 10 shows a primary structure of a hybrid vehicle 1A of a second embodiment.

Referring to FIGS. 10 and 1, hybrid vehicle 1A differs from hybrid vehicle 1 in that abnormality sensing unit 13 and control device 14 in FIG. 1 are replaced with abnormality sensing unit 13A and control device 14A, respectively. Other structures of hybrid vehicle 1A are substantially the same as the corresponding structures of hybrid vehicle 1, and therefore description thereof is not repeated.

Abnormality sensing unit 13A stores, as ranges of the voltage value of the battery cell, a first range (Vd1-Vu1) and a second range (Vd2-Vu2) containing the first range. Abnormality sensing unit 13A turns off both flags FLG1 and FLG2 when all the voltage values of the battery cells included in battery blocks B0-Bn fall within the first range. Abnormality sensing unit 13A turns on flag FLG1 and turns off flag FLG2 when the voltage value of one of the battery cells included in battery blocks B0-Bn falls outside the first range and within the second range. When the voltage value of one of the battery cells included in battery blocks B0-Bn falls outside the second range, abnormality sensing unit 13A turns on both flags FLG1 and FLG2. By turning on flag FLG1, abnormality sensing unit 13A provides an abnormality notification (first notification) to control device 14A. By turning on flag FLG2, abnormality sensing unit 13A provides an abnormality notification (second notification) to control device 14A.

Control device 14A performs the charge/discharge control on battery B based on flags FLG1 and FLG2.

Figure 11:
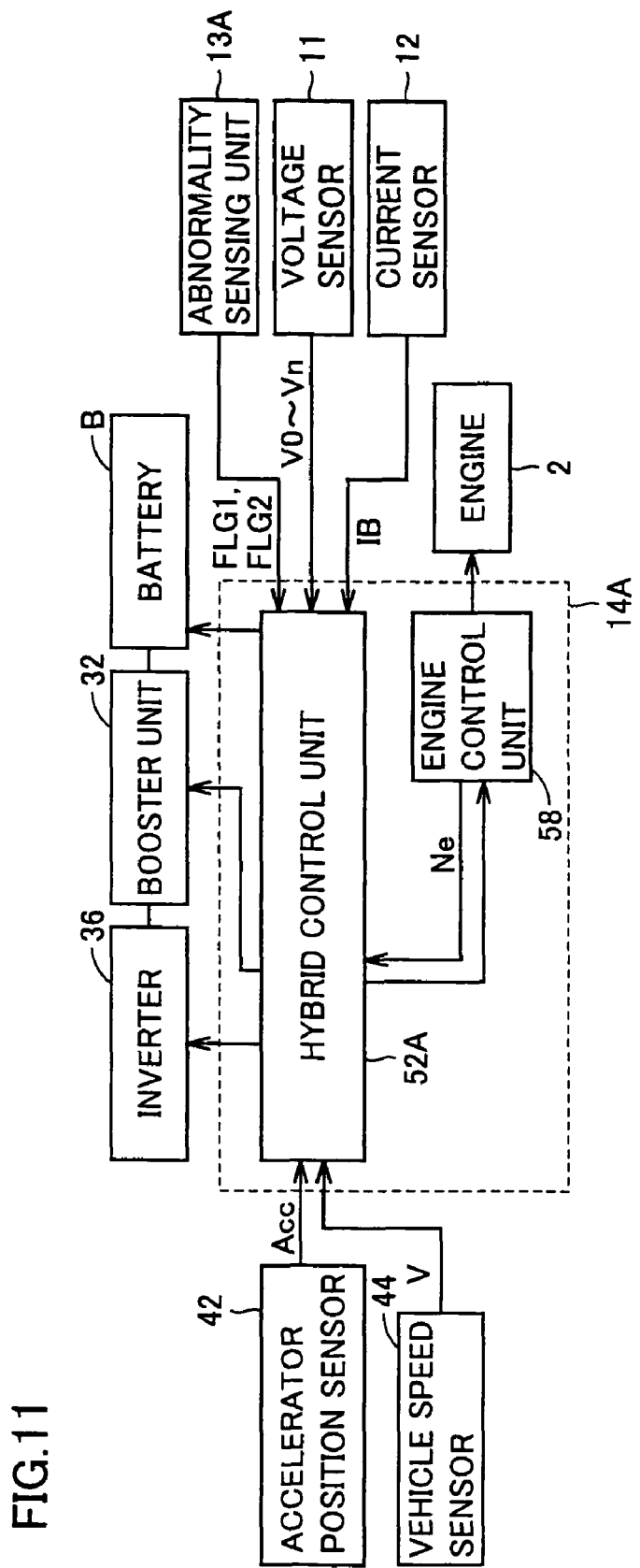
FIG. 11 shows functional blocks of a control device 14A in FIG. 10 and peripheral devices related to it.

FIG. 11 shows functional blocks of control device 14A in FIG. 10 and peripheral devices related to it. Referring to FIGS. 11 and 2, control device 14A differs from control device 14 in that hybrid control unit 52 is replaced with hybrid control unit 52A. Structures of the other portions of control device 14A are substantially the same as those of the corresponding portions of control device 14, and therefore description thereof is not repeated.

Hybrid control unit 52A calculates the SOC (State Of Charge) of battery B based on voltage values V0-Vn received from voltage sensor 11 as well as current value IB received from current sensor 12 and the like. Hybrid control unit 52 controls booster unit 32 and inverter 36 to charge or discharge battery B based on the calculated SOC. Hybrid control unit 52A executes the charge/discharge control to be described later when flag FLG1 is on, and when flag FLG2 is on.

Figure 12:
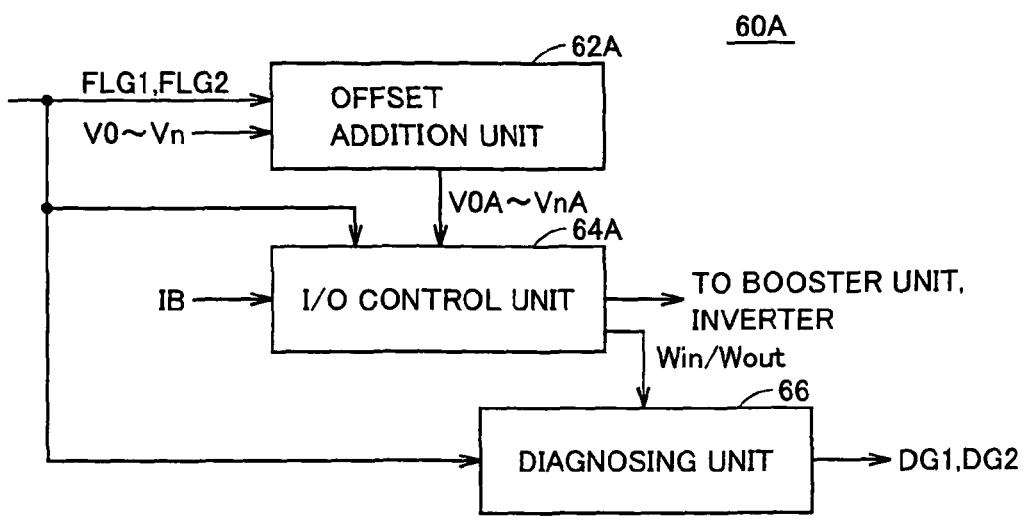
FIG. 12 is a functional block diagram showing a structure of a battery control unit 60A included in a hybrid control unit 52A shown in FIG. 11.

FIG. 12 is a functional block diagram showing a structure of a battery control unit 60A included in hybrid control unit 52A shown in FIG. 11. Referring to FIG. 12, battery control unit 60A includes an offset addition unit 62A, an I/O control unit 64A and a diagnosing unit 66.

Offset addition unit 62A receives voltage values V0-Vn. When flag FLG1 is on, or when flag FLG2 is on, offset addition unit 62A calculates the offset value to be commonly used for voltage values V0-Vn. Offset addition unit 62A adds the offset value to each of voltage values V0-Vn, and outputs voltage values V0A-VnA.

I/O control unit 64A sets the limit value of the electric power supplied to/from battery B based on flags FLG1 and FLG2, current value IB and voltage values V0A-VnA. Win represents the limit value of the electric power supplied to battery B, and Wout represents a limit value of the electric power supplied from battery B. I/O control unit 64A controls inverter 36 and booster unit 32 based on input limit value Win or output limit value Wout.

Diagnosing unit 66 can determine the overcharged state of battery B based on flags FLG1 and FLG2 as well as input limit value Win. Likewise, diagnosing unit 66 can determine the overdischarged state of battery B based on flags FLG1 and FLG2 as well as output limit value Wout. Diagnosing unit 66 provides signals DG1 and DG2 representing results of the diagnoses.

Figure 13:
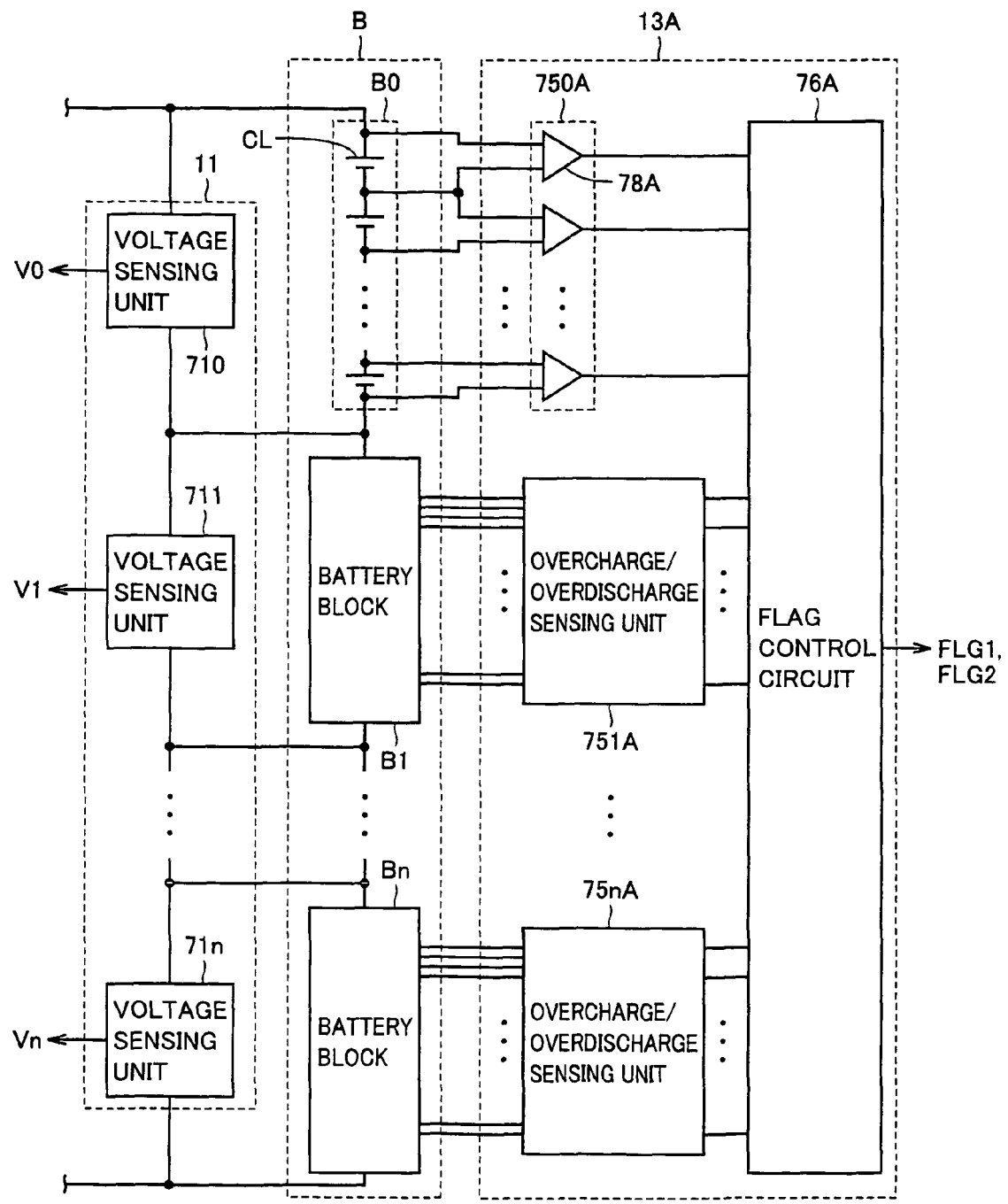
FIG. 13 specifically illustrates battery B mounted on hybrid vehicle 1A and its peripheral structures.

FIG. 13 specifically illustrates battery B mounted on hybrid vehicle 1A and its peripheral structures. Referring to FIG. 13, the structure of battery B is substantially the same as that shown in FIG. 5, and therefore description thereof is not repeated. Abnormality sensing unit 13A includes overcharge/overdischarge sensing units 750A-75nA arranged corresponding to battery blocks B0-Bn, respectively, and a flag control circuit 76A that controls each of flags FLG1 and FLG2 to attain the on or off state based on the outputs of overcharge/overdischarge sensing units 750A-75nA.

Overcharge/overdischarge sensing unit 750A includes a plurality of abnormality determining units 78A arranged corresponding to the plurality of battery cells CL, respectively.

Abnormality determining unit 78A outputs a first signal when the voltage value of corresponding battery cell CL is larger than the upper limit value of the first range (which will be referred to as a "first upper limit value" hereinafter) and is smaller than an upper limit value of the second range (which will be referred to as a "second upper limit value" hereinafter). Abnormality determining unit 78A outputs a second signal when the voltage value of corresponding battery cell CL is larger than the second upper limit value.

Likewise, abnormality determining unit 78A outputs the above first signal when the voltage value of corresponding battery cell CL is smaller than a lower limit value of the first range (which will be referred to as a "first lower limit value" hereinafter) and is larger than a lower limit value of the second range (which will be referred to as a "second range lower limit value" hereinafter). Abnormality determining unit 78A outputs the above second signal when the voltage value of corresponding battery cell CL is smaller than the second lower limit value.

Since each of overcharge/overdischarge sensing units 751A-75nA has substantially the same structure as overcharge/overdischarge sensing unit 750A, description thereof is not repeated.

Flag control circuit 76A turns on only flag FLG1 when one of abnormality determining units 78A outputs the first signal. Flag control circuit 76A turns on both flags FLG1 and FLG2 when one of abnormality determining units 78A outputs the second signal.

As described above, when the voltage value of a certain battery cell falls outside the first range and within the second range, abnormality sensing unit 13A turns on flag FLG1. When this voltage value falls outside the second range, abnormality sensing unit 13A turns on flags FLG1 and FLG2. However, abnormality sensing unit 13A may be configured to turn on the first flag when the voltage value of a certain battery cell is larger than the first limit value, and to turn on the second flag when the voltage value of the cell is larger than the second upper limit value. Further, abnormality sensing unit 13A may be configured to turn on a third flag when the voltage value of a certain battery cell is smaller than the first lower limit value, and to turn on a fourth flag when the voltage value is smaller than the second lower limit value.

Figure 14:
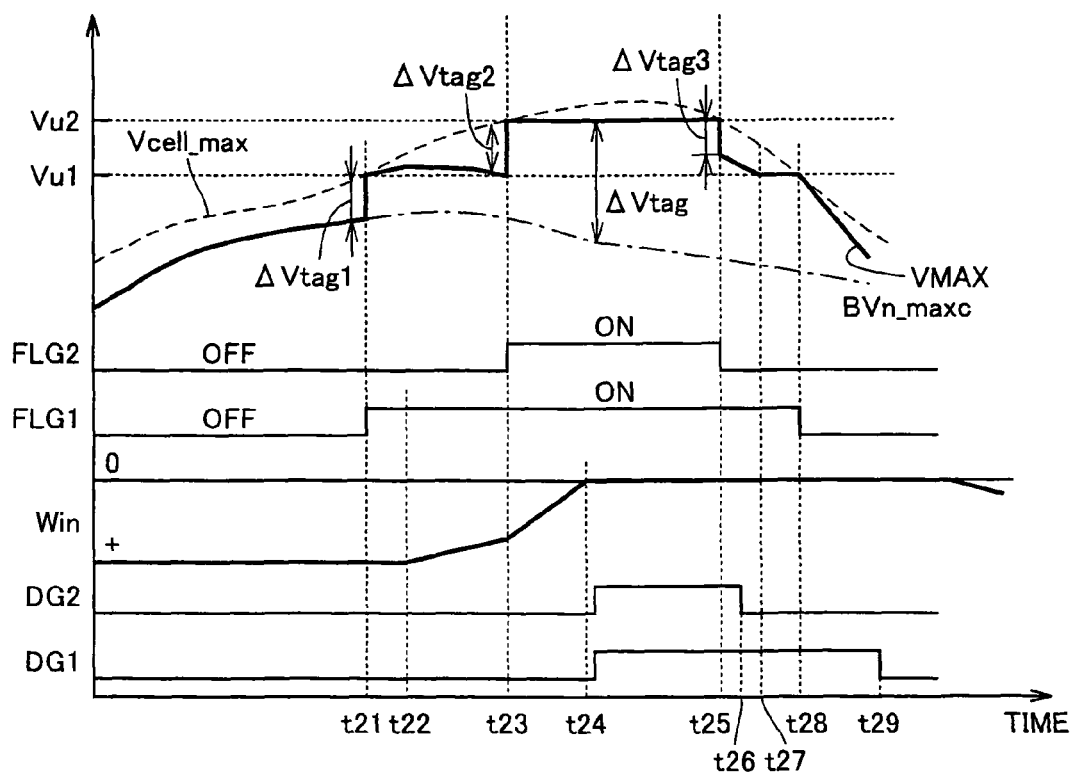
FIG. 14 illustrates control of a battery control unit 60A during charging of battery B.

FIG. 14 illustrates control of battery control unit 60A during the charging of battery B. Referring to FIG. 14, voltage value BVn_maxc is an average value of the cell voltages that are obtained by dividing the maximum voltage value among voltage values V0-Vn (the voltages of the battery block) by the number of the cells included in one battery block. Voltage value VMAX is obtained by adding the offset value per battery cell to voltage value BVn_maxc. It is noted that the offset value is set positive during the charging of battery B. Vcell_max is the maximum value among the voltage values of the plurality of battery cells.

Before a time t21, voltage value Vcell_max is smaller than a first upper limit value Vu1. Therefore, offset addition unit 62A sets the offset value to 0. Thereby, voltage value VMAX becomes equal to voltage value BVn_maxc. Further, abnormality sensing unit 13A turns off both flags FLG1 and FLG2.

Before time t21, input limit value Win is a certain positive value. Diagnosing unit 66 sets each of signals DG1 and DG2 to an L-level because both flags FLG1 and FLG2 are off and input limit value Win is not 0.

At time t21, voltage value Vcell_max reaches first upper limit value Vu1. Thereby, abnormality determining units 78A corresponding to the battery cell that outputs above voltage value Vcell_max outputs the first signal. Flag control circuit 76A (see FIG. 13) turns on flag FLG1 in response to this first signal.

When flag FLG1 is turned on, offset addition unit 62A calculates a difference between first upper limit value Vu1 and voltage value BVn_maxc as voltage difference ΔVtag (the offset value per battery cell). In FIG. 14, voltage difference ΔVtag calculated at time t21 is represented as ΔVtag1.

Offset addition unit 62A adds the offset value obtained by (ΔVtag1×(the number of battery cells per battery block)) to each of voltage values V0-Vn, and outputs voltage values V0A-VnA. I/O control unit 64A sets input limit value Win based on voltage values V0A-VnA and thereby performs the charge control of the battery.

More specifically, I/O control unit 64A starts to decrease gradually input limit value Win at a time t22 after a predetermined time from time t21. I/O control unit 64A determines at certain intervals (e.g., of 1 second) whether voltage value VMAX is larger than first upper limit value Vu1 and lower second upper limit value Vu2, or not. When voltage value VMAX is larger than first upper limit value Vu1 and smaller than second upper limit value Vu2, I/O control unit 64A decreases input limit value Win by a certain amount.

The state where voltage value VMAX is larger than first upper limit value Vu1 and smaller than second upper limit value Vu2 represents that voltage value Vcell_max is larger than first upper limit value Vu1 and smaller than second upper limit value Vu2. In this state, I/O control unit 64A decreases input limit value Win such that a decrease rate representing the amount of decrease of input limit value Win per unit time may become equal to a first value. Thereby, the charge power likewise decreases with the first value.

It may be envisaged to start the decreasing of input limit value Win at time t21, i.e., when flag FLG1 is turned on. However, when the control is performed in this manner, it can be considered that the quantity of the regenerative energy of motor generator MG2 is restricted after time t21, and thereby the braking force by regeneration of motor generator MG2 lowers. Therefore, this embodiment does not immediately decrease input limit value Win after flag FLG1 is turned on. This can reduce the possibility that the braking force of the vehicle lowers.

Before time t22, input limit value Win is constant. Thus, the power supplied to battery B is not restricted. Therefore, voltage value BVn_maxc and voltage value VMAX rise during the period between times t21 and t22. However, during the period between times t22 and t23, I/O control unit 64A gradually lowers input limit value Win. Thereby, the power supplied to battery B gradually lowers so that voltage value VMAX and a voltage value BVn_maxc lower. Offset addition unit 62A continues the calculation of the offset value even during the period between times t21 and t22.

However, voltage value Vcell_max continues rising even after time t21 because the charging of battery B continues. At time t23, voltage value Vcell_max reaches second upper limit value Vu2. Thereby, abnormality determining unit 78A corresponding to the battery cell that outputs above voltage value Vcell_max outputs the second signal. Flag control circuit 76A turns on flag FLG2 in response to this second signal.

When flag FLG2 is turned on, offset addition unit 62A calculates, as voltage difference ΔVtag, a difference between second upper limit value Vu2 and voltage value BVn_maxc. Offset addition unit 62A adds the offset value obtained by (ΔVtag×(the number of battery cells per battery block)) to each of voltage values V0-Vn. At time t23, therefore, voltage value VMAX reaches second upper limit value Vu2. An offset value ΔVtag2 represents the amount of increase of voltage value VMAX at time t23. While flag FLG2 continues the on state, offset addition unit 62A continues the calculation of offset value ΔVtag such that voltage value VMAX keeps second upper limit value Vu2.

When flag FLG2 is turned on, I/O control unit 64A determines at certain intervals, e.g., of 1 second whether voltage value VMAX is equal to second upper limit value Vu2 or not. When voltage value VMAX is equal to second upper limit value Vu2, I/O control unit 64A decreases input limit value Win by a certain amount.

The state where voltage value VMAX is equal to second upper limit value Vu2 represents that voltage value Vcell_max is larger than second upper limit value Vu2. In this state, I/O control unit 64A decreases input limit value Win such that the decrease rate representing the amount of decrease of input limit value Win per unit time may become equal to the second value larger than the foregoing first value. Thereby, the charge power likewise decreases with the second value. Thus, when flag FLG2 is turned on, the power supplied to battery B is restricted to a larger extent than the case where only flag FLG1 is on.

At a time t24, input limit value Win reaches 0. Thus, battery B is no longer supplied with the electric power. Every time a predetermined time, e.g., of 1 second elapses after when input limit value Win becomes 0 (time t24), diagnosing unit 66 determines whether flags FLG1 and FLG2 are on or not. When both flags FLG1 and FLG2 are on, diagnosing unit 66 sets signals DG1 and DG2 to the H-level. Therefore, signals DG1 and DG2 attain the H-level after a predetermined time from time t24. The fact that both signals DG1 and DG2 are at the H-level represents that battery B is in the overcharged state.

Diagnosing unit 66 has a counter function for measuring time. Diagnosing unit 66 uses this counter function and thereby determines at predetermined time intervals whether flags FLG1 and FLG2 are on or not.

Diagnosing unit 66 sets only signal DG1 to the H-level when input limit value Win is 0 and only flag FLG1 is on. The fact that only signal DG1 is at the H-level represents that the charging of battery B has stopped for preventing the overcharged state of battery B.

Voltage value Vcell_max continues rising between times t23 and t24. However, when input limit value Win reaches 0 at time t24, voltage value Vcell_max lowers. After a time t25, voltage value Vcell_max is smaller than second upper limit value Vu2. Thereby, abnormality sensing unit 13A turns off only flag FLG2.

When flag FLG2 is off, offset addition unit 62A calculates the offset value to be added to each of voltage values V0-Vn so that voltage value VMAX may be smaller than second upper limit value Vu2 by a certain amount ΔVtag3. However, flag FLG1 is on so that I/O control unit 64A keeps input limit value Win at 0. Thereby, voltage value VMAX gradually decreases.

At a time t26, diagnosing unit 66 determines that flag FLG2 is turned off, and changes signal DG2 from the on state to the off state. Since flag FLG1 is on at time t26, diagnosing unit 66 keeps signal DG1 on.

At a time t27, voltage value VMAX reaches first upper limit value Vu1. Offset addition unit 62A continues the calculation of voltage difference ΔVtag (offset value of voltage values V0-Vn) so that voltage value VMAX may be kept at first upper limit value Vu1, until flag FLG1 is turned off after time 27 when voltage value VMAX reached first upper limit value Vu1.

Since input limit value Win is 0, voltage value Vcell_max continues lowering. When voltage value Vcell_max reaches first upper limit value Vu1 at a time t28, abnormality sensing unit 13A sets flag FLG1 to the off state.

When flag FLG1 is off, offset addition unit 62A gradually decreases the offset value (e.g., keeps a constant decrease amount of the offset amount per unit time), and thereby changes the offset value toward 0. Thereby, voltage value VMAX gradually approaches voltage value BVn_maxc.

Signal DG1 attains the L-level at a time t29. I/O control unit 64A gradually increases input limit value Win after it sets signal DG1 to the L-level.

Similarly to the first embodiment, voltage difference ΔVtag approaches 0 over a certain time, whereby it is possible to prevent discontinuous changes in power supplied to battery B so that it is possible to prevent occurrence of large changes in behavior of the vehicle and to protect inverter 36 and booster unit 32.

The charge control for the secondary battery according to the second embodiment can be applied to the secondary battery that is formed of the plurality of battery blocks each including the plurality of battery cells. Therefore, the type of the secondary battery is not restricted. However, the control of this embodiment can be appropriately employed for charging the lithium-ion battery, as described below.

When the lithium-ion battery is in the overcharged state, lithium is deposited, and further a damage of the battery such as bursting or ignition may occur. The charge voltage that causes deposition of lithium is lower than the charge voltage that damages the battery. However, the charge voltage at which the lithium is deposited is substantially equal to the open-circuit voltage at which the SOC value is equal to 100% (in other words, at which the battery is in the fully charged state).

For example, when the charging stops because a certain cell attains the charge voltage that may cause deposition of lithium, the voltages of other cells are lower than the above charge voltage. Therefore, insufficient charging of the lithium-ion battery may occur. Also, the regenerative energy quantity of motor generator MG2 becomes zero as already described, and therefore the braking power of hybrid vehicle 1A may lower.

Accordingly, in the operation of charging the lithium-ion battery, it is preferable to control the input power such that the lithium-ion battery can take in the electric power as much as possible, while avoiding the deposition of lithium and the damage in battery.

The second embodiment can satisfy the above requirements. First upper limit value Vu1 is determines based on the charge voltage that may deposit the lithium. The second upper limit value Vu2 is determined based on the charge voltage that may damage the battery (and is, e.g., slightly lower than the charge voltage).

In the second embodiment, offset addition unit 62A outputs voltage values V0A-VnA by adding the offset value to each of voltage values V0-Vn when only flag FLG1 is on, i.e., when voltage value Vcell_max is larger than first upper limit value Vu1 and smaller than second upper limit value Vu2. The above offset value is equal to the product of the difference between first upper limit value Vu1 and voltage value BVn_maxc and the number of cells per block. I/O control unit 64A sets input limit value Win based on voltage values V0A-VnA. Since I/O control unit 64A sets input limit value Win based on the block voltage containing the added offset, input limit value Win becomes small. Thus, the power supplied to battery B becomes small. However, the charging of battery B continues. Thereby, it is possible to supply the power as much as possible to battery B.

Further, when voltage value Vcell_max reaches second upper limit value Vu2, flag FLG2 is turned on. When flag FLG2 is turned on, offset addition unit 62A likewise adds the offset to each of voltage values V0-Vn to output voltage values V0A-VnA. The offset value in this case is equal to the product of the difference between second upper limit value Vu2 and voltage value BVn_maxc and the number of cells per block. Based on voltage values V0A-VnA, I/O control unit 64A sets input limit value Win. When both flags FLG2 and FLG1 are on, I/O control unit 64A sets the rate of decrease of input limit value Win larger than that of input limit value Win that is set when only flag FLG1 is on. Thereby, the input power of battery B is significantly limited (or the charging stops). Thereby, it is possible to prevent such a situation that all the cells included in battery B attain the voltage that may damage the battery.

Therefore, the second embodiment can suppress the deterioration of the battery due to the overcharging.

Figure 15:
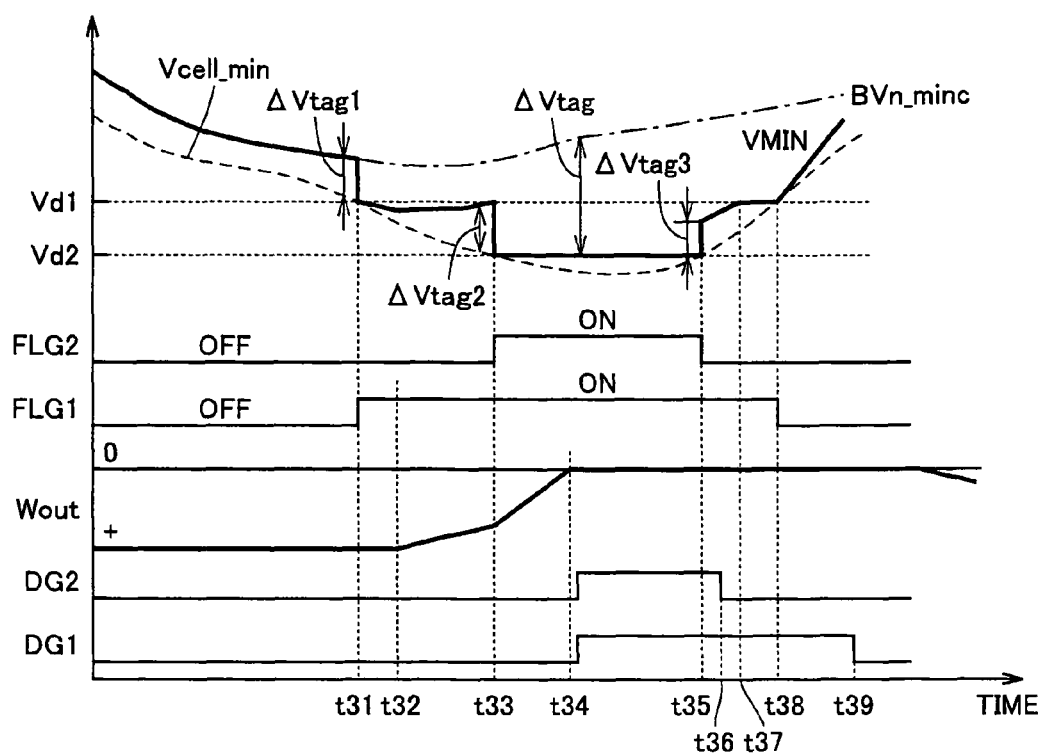
FIG. 15 illustrates control of battery control unit 60A during discharging of battery B.

FIG. 15 illustrates the control of battery control unit 60A during the discharging of battery B. Referring to FIG. 15, voltage value BVn_minc is an average value of the cell voltages that is obtained by dividing the minimum voltage value among voltage values V0-Vn (voltages in the battery block) by the number of cells included in one battery block. Voltage value VMIN is obtained by adding the offset value per battery cell to voltage value BVn_minc. It is noted that the offset value is set negative during the discharging of battery B. Vcell_min is the minimum value of the cell voltage.

Before a time t31, voltage value Vcell_min is larger than first lower limit value Vd1. Therefore, offset addition unit 62A sets the offset value to 0. Thereby, voltage value VMIN becomes equal to voltage value BVn_minc. Abnormality sensing unit 13A turns off both flags FLG1 and FLG2.

Before time t31, output limit value Wout is a certain positive value. Diagnosing unit 66 sets both signals DG1 and DG2 to the L-level because both flags FLG1 and FLG2 are off and output limit value Wout is not 0.

At time t31, voltage value Vcell_min reaches first lower limit value Vd1. Thereby, abnormality determining unit 78A corresponding to the battery cell that outputs this voltage value Vcell_min outputs the first signal. Flag control circuit 76A turns on flag FLG1 in response to the first signal.

When flag FLG1 is turned on, offset addition unit 62A calculates the difference between first lower limit value Vd1 and voltage value BVn_minc as voltage difference ΔVtag (the offset value per battery cell). Similarly to FIG. 14, FIG. 15 represents the offset value calculated at time t31 as ΔVtag1.

Offset addition unit 62A outputs voltage values V0A-VnA by adding the offset value obtained by (ΔVtag1×(the number of battery cells per battery block) to each of voltage values V0-Vn. I/O control unit 64A performs the discharge control of the battery by setting output limit value Wout based on voltage values V0A-VnA.

More specifically, I/O control unit 64A starts to decrease gradually output limit value Wout at a time t32 after a predetermined time from time t31. I/O control unit 64A determines at certain intervals (e.g., of 1 second) whether voltage value VMIN is smaller than first lower limit value Vd1 and larger than second lower limit value Vd2, or not. When voltage value VMIN is smaller than first lower limit value Vd1 and larger than second lower limit value Vd2, I/O control unit 64A decreases output limit value Wout by a certain amount.

The state where voltage value VMIN is smaller than first lower limit value Vd1 and larger than the second lower limit value Vd2 represents that voltage value Vcell_min is larger than first lower limit value Vd1 and smaller than second lower limit value Vd2. In this state, I/O control unit 64A decreases output limit value Wout such that a decrease rate representing the amount of decrease of output limit value Wout per unit time may become equal to a first value. Thereby, the discharge power likewise decreases with the first value.

Before time t32, output limit value Wout is constant. Thus, the power supplied from battery B is not restricted. Therefore, voltage value BVn_minc and voltage value VMIN lower during the period between times t31 and t32. However, during the period between times t32 and t33, I/O control unit 64A gradually decreases output limit value Wout. Thereby, the power supplied from battery B gradually lowers so that voltage value VMIN and voltage value BVn_minc rise. Offset addition unit 62A continues the calculation of the offset value even during the period between times t31 and t32.

Voltage value Vcell_min continues lowering even after time t31 because the discharging of battery B continues. At time t33, voltage value Vcell_min reaches second lower limit value Vd2. Thereby, abnormality determining unit 78A corresponding to the battery cell that outputs above voltage value Vcell_min outputs the second signal. Flag control circuit 76A turns on flag FLG2 in response to this second signal.

When flag FLG2 is turned on, offset addition unit 62A calculates, as offset value ΔVtag, a difference between second lower limit value Vd2 and voltage value BVn_minc. Offset addition unit 62A adds the offset value obtained by (ΔVtag×(the number of battery cells per battery block)) to each of voltage values V0-Vn. At time t33, therefore, voltage value VMIN reaches second lower limit value Vd2. Offset value ΔVtag2 represents the amount of decrease of voltage value VMIN at time t33. While flag FLG2 is on, offset addition unit 62A continues the calculation of voltage value ΔVtag such that voltage value VMIN keeps second lower limit value Vd2.

When flag FLG2 is turned on, I/O control unit 64A determines at certain intervals, e.g., of 1 second whether voltage value VMIN is equal to second lower limit value Vd2 or not. When voltage value VMIN is equal to second lower limit value Vd2, I/O control unit 64A decreases output limit value Wout by a certain amount.

The state where voltage value VMIN is equal to second lower limit value Vd2 represents that voltage value Vcell_min is smaller than second lower limit value Vd2. In this state, I/O control unit 64A decreases output limit value Wout such that the decrease rate representing the amount of decrease of output limit value Wout per unit time may become equal to the second value larger than the foregoing first value. Thereby, the charge power likewise decreases with the second value. Thus, when flag FLG2 is turned on, the power supplied from battery B is restricted to a larger extent than the case where only flag FLG1 is on.

At a time t34, output limit value Wout reaches 0. Thus, battery B no longer supplies the electric power. Every time a predetermined time, e.g., of 1 second elapses after output limit value Wout becomes 0 (time t34), diagnosing unit 66 determines whether flags FLG1 and FLG2 are on or not. When both flags FLG1 and FLG2 are on, diagnosing unit 66 sets signals DG1 and DG2 to the H-level. Therefore, signals DG1 and DG2 attain the H-level after a predetermined time from time t34. The fact that both signals DG1 and DG2 are at the H-level represents that battery B is in the overdischarged state.

Diagnosing unit 66 sets only signal DG1 to the H-level when output limit value Wout is 0 and only flag FLG1 is on. The fact that only signal DG1 is at the H-level represents that the discharging of battery B has stopped for preventing the overdischarged state of battery B.

Voltage value Vcell_max continues lowering between times t33 and t34. However, when output limit value Wout reaches 0 at time t34, voltage value Vcell_min rises. After a time t35, voltage value Vcell_min is larger than second lower limit value Vd2, Thereby, abnormality sensing unit 13A turns off only flag FLG2.

When flag FLG2 is off, offset addition unit 62A calculates the offset value to be added to each of voltage values V0-Vn so that voltage value VMIN may be larger than second lower limit value Vd2 by certain amount ΔVtag3. However, flag FLG1 is on so that I/O control unit 64A keeps output limit value Wout at 0. Thereby, voltage value VMIN gradually decreases.

At a time t36, diagnosing unit 66 determines that flag FLG2 is turned off, and changes signal DG2 from the on state to the off state. Since flag FLG1 is on at time t36, diagnosing unit 66 keeps signal DG1 on.

At a time t37, voltage value VMIN reaches first lower limit value Vd1. Offset addition unit 62A continues the calculation of voltage difference ΔVtag (offset value of voltage values V0-Vn) so that voltage value VMIN may be kept at first lower limit value Vd1, until flag FLG1 is turned off after time 37 when voltage value VMIN reached first lower limit value Vd1.

Since output limit value Wout is 0, voltage value Vcell_min continues rising. When voltage value Vcell_min reaches first lower limit value Vd1 at a time t38, abnormality sensing unit 13A sets flag FLG1 to the off state.

When flag FLG1 is off, offset addition unit 62A gradually decreases the offset value (e.g., keeps a constant decrease amount of the offset amount per unit time), and thereby changes the offset value toward 0. Thereby, voltage value VMIN gradually approaches voltage value BVn_minc.

Signal DG1 attains the L-level at a time t39. I/O control unit 64A gradually increases output limit value Wout after it sets signal DG1 to the L-level.

Similarly to the charging operation of battery B, voltage difference ΔVtag approaches 0 over a certain time, whereby it is possible to prevent discontinuous changes in power supplied from battery B so that it is possible to prevent occurrence of large changes in behavior of the vehicle and to protect inverter 36 and booster unit 32.

For example, second lower limit value Vd2 is set slightly higher than the voltage of the battery that is overdischarged. Similarly to the charging of battery B, when only flag FLG1 is on (i.e., when voltage value Vcell_min is smaller than first lower limit value Vd1 and is larger than second lower limit value Vd2), offset addition unit 62A adds the offset value to each of voltage values V0-Vn to output voltage values V0A-VnA. The offset value in this operation is equal to a value obtained by multiplying a difference between the first lower limit value and voltage value BVn_minc by the number of cells per block. I/O control unit 64A sets output limit value Wout based on voltage values V0A-VnA. Since I/O control unit 64A sets output limit value Wout based on the block voltage containing the added offset, output limit value Wout becomes small. Thus, the power supplied from battery B becomes small. However, the discharging of battery B continues. Thereby, it is possible to supply the power as much as possible to battery B.

Further, when voltage value Vcell_max reaches second lower limit value Vd2, flag FLG2 is turned on. When flag FLG2 is turned on, offset addition unit 62A likewise adds the offset to each of voltage values V0-Vn to output voltage values V0A-VnA. The offset value in this case is obtained by multiplying the difference between second lower limit value Vd2 and voltage value BVn_minc by the number of cells per block. Based on voltage values V0A-VnA, I/O control unit 64A sets output limit value Wout. When both flags FLG2 and FLG1 are on, I/O control unit 64A sets the rate of decrease of output limit value Wout larger than that of output limit value Wout that is set when only flag FLG1 is on. Thereby, the output power of battery B is significantly limited (or the charging stops). Thereby, the overdischarging of battery B can be prevented.

The discharge control of the secondary battery according to the second embodiment can be applied to the secondary battery that is formed of the plurality of battery blocks each including the plurality of battery cells. Therefore, the type of the secondary battery is not restricted. For example, it can be applied to the lithium-ion battery and nickel hydrogen battery.

Similarly to the first embodiment, the second embodiment employs abnormality sensing unit 13A that senses the overcharge (or overdischarge) occurring in at least one of the battery cells. When abnormality sensing unit 13A turns on flag FLG1 or FLG2, the charge/discharge of the battery is controlled based on the value obtained by adding the offset value to the voltage value of voltage sensor 11. Thereby, even when the battery voltage is sensed a battery block at a time, the voltage value can be controlled a cell at a time. Therefore, it is possible to suppress the deterioration of the battery due to the overcharge or overdischarge.

The embodiments have been described in connection with the examples applied to the series/parallel-type hybrid system in which the power splitting mechanism can split the drive power of the engine for transmitting it to the axles and the power generators. However, the invention can be widely applied to vehicles employing the secondary battery as the electric power source.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A control device for a secondary battery having a plurality of battery cells forming a plurality of battery blocks, comprising:
    an abnormality sensing unit sensing the fact that a cell voltage value of one of said plurality of battery cells falls outside a preset range and outputting an abnormality notification indicating a result of the sensing;
    a voltage sensing unit sensing a plurality of block voltages corresponding to said plurality of battery blocks, respectively, and outputting a plurality of first voltage values representing said plurality of block voltages, respectively;
    an offset addition unit calculating, in response to reception of said abnormality notification, an offset amount common to said plurality of first voltage values based on said plurality of first voltage values, said preset range and the number of said battery cells included in each of said plurality of battery blocks, and producing a plurality of second voltage values by adding said offset amount to each of said plurality of first voltage values; and
    a charge/discharge control unit limiting the charge power of said secondary battery and the discharge power of said secondary battery based on said plurality of second voltage values produced by said offset addition unit.

2. The control device for the secondary battery according to claim 1, wherein
    said offset addition unit sets said offset amount to zero when said offset addition unit senses ending of the output of said abnormality notification by said abnormality sensing unit.

3. The control device for the secondary battery according to claim 2, wherein
    said offset addition unit starts to decrease gradually said offset amount when said abnormality sensing unit ends the output of said abnormality notification.

4. The control device for the secondary battery according to claim 1, wherein
    said offset addition unit adds a predetermined amount as said offset amount to each of said plurality of first voltage values, when said offset amount being calculated exceeds said predetermined amount.

5. The control device for the secondary battery according to claim 1, wherein
    when said secondary battery is charged, said offset addition unit calculates, based on the maximum voltage value among said plurality of first voltage values and the number of said battery cells included in the battery block corresponding to said maximum voltage value among said plurality of battery blocks, an average value of the voltages of said battery cells included in said corresponding battery block and calculates said offset amount based on a difference between an upper limit value of said preset range and said average value as well as the number of said battery cells included in said corresponding battery block.

6. The control device for the secondary battery according to claim 1, wherein
    when said secondary battery is discharged, said offset addition unit calculates, based on the minimum voltage value among said plurality of first voltage values and the number of said battery cells included in the battery block corresponding to said minimum voltage value among said plurality of battery blocks, an average value of the voltages of said battery cells included in said corresponding battery block and calculates said offset amount based on a difference between a lower limit value of said preset range and said average value as well as the number of said battery cells included in said corresponding battery block.

7. The control device for the secondary battery according to claim 1, wherein
    said abnormality sensing unit stores, as said preset range, a first range and a second range including said first range, outputs a first notification as said abnormality notification when said abnormality sensing unit senses that said cell voltage value falls outside said first range, and outputs said first notification and a second notification as said abnormality notification when said abnormality sensing unit senses that said cell voltage value falls outside said second range.

8. The control device for the secondary battery according to claim 7, wherein
    said first range has a first upper limit value,
    said second range has a second upper limit value, and
    during the charging of said secondary battery, said charge/discharge control unit decreases said charge power such that a decrease rate representing an amount of decrease of said charge power per unit time takes a first value when said cell voltage value is larger than said first upper limit value and smaller than said second upper limit value, and decreases said charge power such that said decrease rate takes a second value larger than the first value when said cell voltage value is larger than said second upper limit value.

9. The control device for the secondary battery according to claim 8, further comprising:
a diagnosing unit diagnosing said secondary battery as being in the overcharged state when said charge power is zero and said abnormality sensing unit outputs said first and second notifications.

10. The control device for the secondary battery according to claim 7, wherein
said first range has a first lower limit value,
said second range has a second lower limit value,
during the discharging of said secondary battery, said charge/discharge control unit decreases said discharge power such that a decrease rate representing an amount of decrease of said discharge power per unit time takes a first value when said cell voltage value is smaller than said first lower limit value and larger than said second lower limit value, and decreases said discharge power such that said decrease rate takes a second value larger than the first value when said cell voltage value is smaller than said second lower limit value.

11. The control device for the secondary battery according to claim 10, further comprising:
a diagnosing unit diagnosing said secondary battery as being in the overdischarged state when said discharge power is zero and said abnormality sensing unit outputs said first and second notifications.

12. The control device for the secondary battery according to claim 1, wherein
said plurality of battery cells include a lithium-ion battery.

13. A vehicle, comprising:
a secondary battery having a plurality of battery cells forming a plurality of battery blocks; and
a control device controlling charge/discharge of said secondary battery,
said control device including:
an abnormality sensing unit sensing the fact that a cell voltage value of one of said plurality of battery cells falls outside a preset range and outputting an abnormality notification indicating a result of the sensing;
a voltage sensing unit sensing a plurality of block voltages corresponding to said plurality of battery blocks, respectively, and outputting a plurality of first voltage values representing said plurality of block voltages, respectively;
an offset addition unit calculating, in response to reception of said abnormality notification, an offset amount common to said plurality of first voltage values based on said plurality of first voltage values, said preset range and the number of said battery cells included in each of said plurality of battery blocks, and producing a plurality of second voltage values by adding said offset amount to each of said plurality of first voltage values; and
a charge/discharge control unit limiting the charge power of said secondary battery and the discharge power of said secondary battery based on said plurality of second voltage values produced by said offset addition unit.

14. The vehicle according to claim 13, wherein
said offset addition unit sets said offset amount to zero when said offset addition unit senses ending of the output of said abnormality notification by said abnormality sensing unit.

15. The vehicle according to claim 14, wherein
said offset addition unit starts to decrease gradually said offset amount when said abnormality sensing unit ends the output of said abnormality notification.

16. The vehicle according to claim 13, wherein
said offset addition unit adds a predetermined amount as said offset amount to each of said plurality of first voltage values, when said offset amount being calculated exceeds said predetermined amount.

17. The vehicle according to claim 13, wherein
when said secondary battery is charged, said offset addition unit calculates, based on the maximum voltage value among said plurality of first voltage values and the number of said battery cells included in the battery block corresponding to said maximum voltage value among said plurality of battery blocks, an average value of the voltages of said battery cells included in said corresponding battery block and calculates said offset amount based on a difference between an upper limit value of said preset range and said average value as well as the number of said battery cells included in said corresponding battery block.

18. The vehicle according to claim 13, wherein
when said secondary battery is discharged, said offset addition unit calculates, based on the minimum voltage value among said plurality of first voltage values and the number of said battery cells included in the battery block corresponding to said minimum voltage value among said plurality of battery blocks, an average value of the voltages of said battery cells included in said corresponding battery block and calculates said offset amount based on a difference between a lower limit value of said preset range and said average value as well as the number of said battery cells included in said corresponding battery block.

19. The vehicle according to claim 13, wherein
said abnormality sensing unitstores, as said preset range, a first range and a second range including said first range, outputs a first notification as said abnormality notification when said abnormality sensing unit senses that said cell voltage value falls outside said first range, and outputs said first notification and a second notification as said abnormality notification when said abnormality sensing unit senses that said cell voltage value falls outside said second range.

20. The vehicle according to claim 19, wherein
said first range has a first upper limit value,
said second range has a second upper limit value, and
during the charging of said secondary battery, said charge/discharge control unit decreases said charge power such that a decrease rate representing an amount of decrease of said charge power per unit time takes a first value when said cell voltage value is larger than said first upper limit value and smaller than said second upper limit value, and decreases said charge power such that said decrease rate takes a second value larger than the first value when said cell voltage value is larger than said second upper limit value.

21. The vehicle according to claim 20, wherein
said control device further includes:
a diagnosing unit diagnosing said secondary battery as being in the overcharged state when said charge power is zero and said abnormality sensing unit outputs said first and second notifications.

22. The vehicle according to claim 19, wherein
said first range has a first lower limit value,
said second range has a second lower limit value, during the discharging of said secondary battery, said charge/discharge control unit decreases said discharge power such that a decrease rate representing an amount of decrease of said discharge power per unit time takes a first value when said cell voltage value is smaller than said first lower limit value and larger than said second lower limit value, and decreases said discharge power such that said decrease rate takes a second value larger than the first value when said cell voltage value is smaller than said second lower limit value.

23. The vehicle according to claim 22, wherein
said control device further includes:
a diagnosing unit diagnosing said secondary battery as being in the overdischarged state when said discharge power is zero and said abnormality sensing unit outputs said first and second notifications.

24. The vehicle according to claim 13, wherein
said plurality of battery cells include a lithium-ion battery.

* * * * *